（12）United States Patent
Siomina et al.

(10) Patent No.: US 10,051,677 B2
(45) Date of Patent: Aug. 14, 2018

(54) PROVIDING, OBTAINING, AND USING D2D-RELATED CAPABILITY OF A NETWORK NODE

(71) Applicant: Telefonaktiebolaget L M Ericsson (publ), Stockholm (SE)

(72) Inventors: Iana Siomina, Solna (SE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/600,522

(22) Filed: Jan. 20, 2015

(65) Prior Publication Data

US 2015/0215982 A1    Jul. 30, 2015

Related U.S. Application Data

(60) Provisional application No. 61/931,037, filed on Jan. 24, 2014.

(51) Int. Cl.
*H04L 12/26* (2006.01)
*H04W 76/14* (2018.01)
(Continued)

(52) U.S. Cl.
CPC ......... *H04W 76/14* (2018.02); *H04W 76/023* (2013.01); *H04W 24/08* (2013.01); *H04W 88/06* (2013.01)

(58) Field of Classification Search
None
See application file for complete search history.

(56) References Cited

U.S. PATENT DOCUMENTS

2012/0131153 A1   5/2012   Schmidt et al.
2012/0290650 A1  11/2012   Montuno et al.
(Continued)

FOREIGN PATENT DOCUMENTS

EP   2665297 A1   11/2013
EP   2763495 A1    8/2014
(Continued)

OTHER PUBLICATIONS

Non-Final Office Action for U.S. Appl. No. 14/600,449, dated Dec. 3, 2015, 22 pages.
(Continued)

*Primary Examiner* — Rebecca E Song
(74) *Attorney, Agent, or Firm* — Withrow & Terranova, PLLC

(57) ABSTRACT

The present disclosure relates to systems and methods for providing, obtaining, and using Device-to-Device (D2D) related capability information for a network node in a cellular communications network. Embodiments of a wireless device for operation in a cellular communications system are disclosed. In some embodiments, the wireless device comprises a transceiver including at least one transmitter and at least one receiver, at least one processor, and memory containing instructions executable by the at least one processor whereby the wireless device is operative to obtain D2D related capability information for one or more network nodes in the cellular communications system and use the D2D related capability information to perform one or more tasks.

39 Claims, 20 Drawing Sheets

(51) Int. Cl.
*H04W 76/02* (2009.01)
*H04W 24/08* (2009.01)
*H04W 88/06* (2009.01)

(56) References Cited

U.S. PATENT DOCUMENTS

| | | | |
|---|---|---|---|
| 2013/0109301 A1* | 5/2013 | Hakola | H04W 76/023 455/39 |
| 2013/0150051 A1 | 6/2013 | Van Phan et al. | |
| 2013/0301438 A1* | 11/2013 | Li | H04W 76/048 370/252 |
| 2013/0324114 A1 | 12/2013 | Raghothaman et al. | |
| 2014/0153390 A1 | 6/2014 | Ishii et al. | |
| 2014/0206348 A1 | 7/2014 | Johnsson et al. | |
| 2014/0235248 A1* | 8/2014 | Chai | H04W 76/023 455/436 |
| 2014/0274066 A1 | 9/2014 | Fodor et al. | |
| 2015/0043429 A1* | 2/2015 | Kim | H04W 4/008 370/328 |
| 2015/0043448 A1* | 2/2015 | Chatterjee | H04W 8/005 370/329 |
| 2015/0189685 A1* | 7/2015 | Yao | H04W 76/023 455/426.1 |
| 2015/0208452 A1* | 7/2015 | Lee | H04W 36/0061 455/426.1 |
| 2015/0215767 A1 | 7/2015 | Siomina et al. | |
| 2015/0223279 A1* | 8/2015 | Jiao | H04W 48/12 370/312 |
| 2015/0327047 A1* | 11/2015 | Tiirola | H04W 8/005 370/338 |
| 2015/0341773 A1 | 11/2015 | Ribeiro et al. | |
| 2016/0066209 A1* | 3/2016 | Lin | H04W 48/06 370/230 |
| 2016/0323868 A1* | 11/2016 | Kalhan | H04W 72/1278 |

FOREIGN PATENT DOCUMENTS

| | | |
|---|---|---|
| WO | 2011051745 A1 | 5/2011 |
| WO | 2012152224 A1 | 11/2012 |
| WO | 2013044864 A1 | 4/2013 |
| WO | 2013055271 A1 | 4/2013 |
| WO | WO 2013/055271 * | 4/2013 |

OTHER PUBLICATIONS

Author Unknown, "Technical Specification Group Services and Systems Aspects; Feasibility study for Proximity Services (ProSe) (Release 12)," Technical Report 22.803, Version 12.2.0, 3GPP Organizational Partners, Jun. 2013, 45 pages.
Final Office Action for U.S. Appl. No. 14/600,449, dated Apr. 8, 2016, 24 pages.
Advisory Action, Examiner-Initiated Interview Summary, and AFCP 2.0 Decision for U.S. Appl. No. 14/600,449, dated Jun. 30, 2016, 5 pages.
Non-Final Office Action for U.S. Appl. No. 14/600,449, dated Sep. 9, 2016, 26 pages.
Final Office Action for U.S. Appl. No. 14/600,449, dated Mar. 28, 2017, 30 pages.
Advisory Action for U.S. Appl. No. 14/600,449, dated Jul. 17, 2017, 6 pages.
Non-Final Office Action for U.S. Appl. No. 14/600,449, dated Oct. 5, 2017, 27 pages.
Author Unknown, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 11)," Technical Speification 36.300, Version 11.6.0, 3GPP Organizational Partners, Jun. 2013, 209 pages.
International Search Report and Written Opinion for International Patent Application No. PCT/IB2015/050500, dated May 19, 2015, 18 pages.
International Search Report and Written Opinion for International Patent Application No. PCT/IB2015/050503, dated Jun. 24, 2015, 10 pages.
Final Office Action for U.S. Appl. No. 14/600,449, dated May 3, 2018, 21 pages.

* cited by examiner

US 10,051,677 B2

PROVIDING, OBTAINING, AND USING D2D-RELATED CAPABILITY OF A NETWORK NODE

RELATED APPLICATIONS

This application claims the benefit of provisional patent application Ser. No. 61/931,037, filed Jan. 24, 2014, the disclosure of which is hereby incorporated herein by reference in its entirety.

FIELD OF THE DISCLOSURE

The present disclosure relates to Device-to-Device (D2D) communication in a cellular communications system and, in particular, to providing, obtaining, and using D2D related capability information of a network node in the cellular communications system.

BACKGROUND

Device-to-Device (D2D) communication in a cellular communications system is receiving a significant amount of interest, particularly with respect to next and future generation networks. D2D communication is communication between a source device and a target device, where both the source device and the target device are wireless devices (e.g., User Equipment devices (UEs) in $3^{rd}$ Generation Partnership Project (3GPP) terminology). Some of the potential advantages of D2D communication include offloading of the cellular network, faster communication, increased awareness of surrounding wireless devices of interest (e.g., running the same application), higher-quality links due to a shorter distance, etc. Some appealing applications of D2D communications are video streaming, online gaming, media downloading, Peer-to-Peer (P2P), file sharing, etc.

As such, there is a need for systems and methods for enabling and implementing D2D communication between wireless devices in a cellular communications system.

SUMMARY

The present disclosure relates to systems and methods for providing, obtaining, and using Device-to-Device (D2D) related capability information for a network node in a cellular communications network. Embodiments of a wireless device for operation in a cellular communications system are disclosed. In some embodiments, the wireless device comprises a transceiver including at least one transmitter and at least one receiver, at least one processor, and memory containing instructions executable by the at least one processor whereby the wireless device is operative to obtain D2D related capability information for one or more network nodes in the cellular communications system and use the D2D related capability information to perform one or more tasks.

In some embodiments, for each network node of the one or more network nodes, the D2D related capability information comprises information indicative of an ability of the network node in regard to one or more D2D activities.

In some embodiments, for each network node of the one or more network nodes, the D2D related capability information comprises information indicative of an ability of the network node in regard to one or more D2D activities on a certain carrier frequency, information indicative of an ability of the network node in regard to one or more D2D activities in a certain frequency band, information indicative of an ability of the network node in regard to one or more D2D activities in one or more specific Radio Access Technologies (RATs), and/or information indicative of an ability of the network node in regard to one or more D2D activities in a certain bandwidth.

In some embodiments, for each network node of the one or more network nodes, the D2D related capability information comprises information indicative of an ability of the network node in regard to one or more D2D activities of a certain type, information indicative of an ability of the network node in regard to one or more D2D activities for a certain purpose, information indicative of an ability of the network node in regard to one or more D2D activities for a certain application, and/or information indicative of an ability of the network node in regard to one or more D2D activities for a certain service type.

In some embodiments, for each network node of the one or more network nodes, the D2D related capability information comprises at least one of a group consisting of information indicative of an ability of the network node in regard to one or more D2D activities for a certain type of wireless device, and/or information indicative of an ability of the network node in regard to one or more D2D activities for wireless devices having one or more predefined characteristics.

In some embodiments, for each network node of the one or more network nodes, the D2D related capability information comprises information indicative of an ability of the network node to support a certain type of scheduling for D2D activities.

In some embodiments, for each network node of the one or more network nodes, the D2D related capability information comprises at least one of a group consisting of information indicative of a number of D2D links that the network node is able to support, information indicative of a number of D2D connections that the network node is able to support, and/or information indicative of a number of D2D sessions that the network node is able to support.

In some embodiments, for each network node of the one or more network nodes, the D2D related capability information comprises at least one of a group consisting of information indicative of an ability of the network node to obtain D2D related capability information of another network node and/or information indicative of an ability of the network node to provide its own D2D related capability information.

In some embodiments, the one or more network nodes comprise a radio access node.

In some embodiments, in order to obtain the D2D related capability information, the wireless device is further operative to obtain the D2D related capability information via signaling received from a signaling node via the transceiver. Further, in some embodiments, the signaling node is one of the one or more network nodes. In other embodiments, the signaling node is a network node in the cellular communications system other than the one or more network nodes. In some embodiments, the signaling is either signaling at a protocol layer higher than a physical layer or signaling at the physical layer.

In some embodiments, in order to obtain the D2D related capability information, the wireless device is further operative to obtain the D2D related capability information for the one or more network nodes from internal storage of the wireless device or external storage accessible by the wireless device.

In some embodiments, wherein one of the one or more network nodes is a radio network node and, in order to obtain the D2D related capability information, the wireless device is further operative to perform one or more measurements on one or more known signals transmitted by the radio network node and determine the D2D related capability information for the radio network node based on the one or more measurements.

In some embodiments, in order to obtain the D2D related capability information, the wireless device is further operative to determine the D2D related capability information for the one or more network nodes based on one or more predefined rules.

In some embodiments, the one or more tasks comprise at least one of: (a) selecting a mode of operation of the wireless device from at least two of a group of modes of operation consisting of: a cellular operation mode, a D2D operation mode, and a specific D2D operation mode; (b) making a decision related to mobility of the wireless device; (c) determining a measurement configuration of the wireless device; (d) ranking or deciding a priority of at least one of the one or more network nodes for one or more Radio Resource Management (RRM) procedures; (e) ranking or deciding a priority of at least one cell served by at least one of the one or more network nodes for one or more RRM procedures; (f) selecting one or more measurements for measurement logging; (g) selecting one or more measurements for measurement reporting; (h) reporting one or more D2D related capabilities of at least one of the one or more network nodes to another network node; and (i) relaying at least some of the D2D related capability information for at least one of the one or more network nodes to another node.

Embodiments of a method of operation of a wireless device for operation in a cellular communications system are also disclosed. In some embodiments, the method of operation of the wireless device comprises obtaining D2D related capability information for one or more network nodes in the cellular communications system and using the D2D related capability information to perform one or more tasks.

Embodiments of a network node in a cellular communications system are also disclosed. In some embodiments, the network node comprises at least one communication interface, at least one processor, and memory containing instructions executable by the at least one processor whereby the network node is operative to obtain D2D related capability information for one or more network nodes in the cellular communications system and use the D2D related capability information to perform one or more tasks.

In some embodiments, for each network node of the one or more network nodes, the D2D related capability information comprises information indicative of an ability of the network node in regard to one or more D2D activities.

In some embodiments, for each network node of the one or more network nodes, the D2D related capability information comprises information indicative of an ability of the network node in regard to one or more D2D activities on a certain carrier frequency, information indicative of an ability of the network node in regard to one or more D2D activities in a certain frequency band, information indicative of an ability of the network node in regard to one or more D2D activities in one or more specific RATs, and/or information indicative of an ability of the network node in regard to one or more D2D activities in a certain bandwidth.

In some embodiments, for each network node of the one or more network nodes, the D2D related capability information comprises information indicative of an ability of the network node in regard to one or more D2D activities of a certain type, information indicative of an ability of the network node in regard to one or more D2D activities for a certain purpose, information indicative of an ability of the network node in regard to one or more D2D activities for a certain application, and/or information indicative of an ability of the network node in regard to one or more D2D activities for a certain service type.

In some embodiments, for each network node of the one or more network nodes, the D2D related capability information comprises information indicative of an ability of the network node in regard to one or more D2D activities for a certain type of wireless device and/or information indicative of an ability of the network node in regard to one or more D2D activities for wireless devices having one or more predefined characteristics.

In some embodiments, for each network node of the one or more network nodes, the D2D related capability information comprises information indicative of an ability of the network node to support a certain type of scheduling for D2D activities.

In some embodiments, for each network node of the one or more network nodes, the D2D related capability information comprises information indicative of a number of D2D links that the network node is able to support, information indicative of a number of D2D connections that the network node is able to support, and/or information indicative of a number of D2D sessions that the network node is able to support.

In some embodiments, for each network node of the one or more network nodes, the D2D related capability information comprises information indicative of an ability of the network node to obtain D2D related capability information of another network node and/or information indicative of an ability of the network node to provide its own D2D related capability information.

In some embodiments, the one or more network nodes comprise the network node.

In some embodiments, the one or more network nodes comprise at least one network node other than the network node.

In some embodiments, in order to use the D2D related capability information, the network node is further operative to signal the D2D related capability information to a wireless device.

In some embodiments, the network node is a radio network node and, in order to use the D2D related capability information, the radio network node is further operative to broadcast or multicast the D2D related capability information.

In some embodiments, in order to use the D2D related capability information, the network node is further operative to signal the D2D related capability information to another network node.

In some embodiments, in order to obtain the D2D related capability information, the network node is further operative to obtain the D2D related capability information via signaling received from another network node.

In some embodiments, in order to obtain the D2D related capability information, the network node is further operative to receive the D2D related capability information from a wireless device.

In some embodiments, in order to obtain the D2D related capability information, the network node is further operative to obtain the D2D related capability information for the one or more network nodes from internal storage of the network node or external storage accessible by the network node.

In some embodiments, the one or more network nodes comprise a radio network node and, in order to obtain the D2D related capability information, the network node is further operative to determine the D2D related capability information for the radio network node based on one or more measurements performed on one or more known signals transmitted by the radio network node.

In some embodiments, in order to obtain the D2D related capability information, the network node is further operative to determine the D2D related capability information for the one or more network nodes based on one or more predefined rules.

In some embodiments, the one or more tasks comprise at least one of: (a) selecting a mode of operation of a wireless device from at least two of a group of modes of operation consisting of: a cellular operation mode, a D2D operation mode, and a specific D2D operation mode; (b) making a decision related to mobility of a wireless device; (c) determining a measurement configuration of a wireless device; (d) selectively collecting measurements from a wireless device that are within coverage of one or more radio network nodes having D2D capability; (e) controlling D2D operation of at least one of the one or more network nodes; (f) ranking or deciding a priority of at least one of the one or more network nodes for one or more RRM procedures; (g) ranking or deciding a priority of at least one cell served by at least one of the one or more network nodes for one or more RRM procedures; (h) reporting one or more D2D related capabilities of at least one of the one or more network nodes to another network node; and (i) relaying at least some of the D2D related capability information for at least one of the one or more network nodes to another node.

Embodiments of a method of operation of a network node in a cellular communications system are also disclosed. In some embodiments, the method of operation of the network node comprises obtaining D2D related capability information for one or more network nodes in the cellular communications system and using the D2D related capability information to perform one or tasks.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
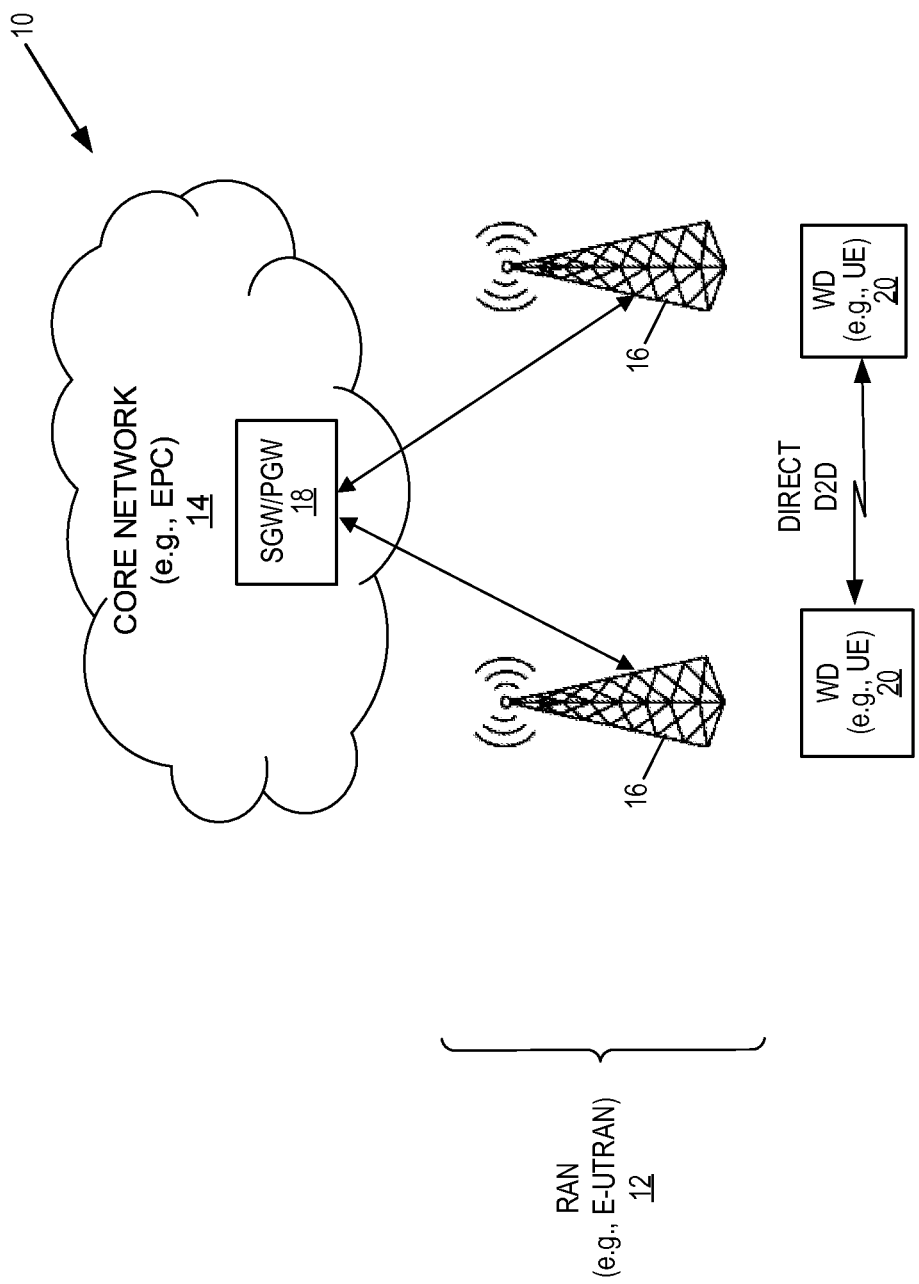
FIG. 1 illustrates direct Device-to-Device (D2D) communication between two wireless devices via a direct D2D link in a cellular communications system.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to systems and methods for providing, obtaining, and using Device-to-Device (D2D) related capability information for a network node in a cellular communications network. Before proceeding, a description of some terminology that is used throughout this disclosure is beneficial.

D2D: As used herein, the terms D2D and Proximity Service (ProSe) may be used interchangeably.

D2D Device: As used herein, a D2D device, or interchangeably called a wireless device or User Equipment (UE) in some embodiments herein, is any device capable of at least receiving or transmitting radio signals on a direct or locally routed radio link between the D2D device and another D2D device. A D2D device (or D2D-capable device) may also be comprised in a cellular UE, a Personal Digital Assistant (PDA), a laptop, a mobile phone, a sensor, a relay, a D2D relay, or even a small base station (e.g., a low power or small cell base station) employing a UE-like interface.

D2D Transmission: As used herein, a D2D transmission is any transmission by a D2D device. Some examples of D2D transmission are physical signals or physical channels, dedicated or common/shared signals, e.g., a reference signal, a synchronization signal, a control channel, a data channel, a broadcast channel, a paging channel, etc. A D2D transmission on a direct or locally routed radio link is intended for receiving by another D2D device. A D2D transmission may be a unicast, groupcast, or broadcast transmission.

D2D Communication: As used herein, D2D communication is communication over a D2D link between at least a source D2D device and a target D2D device. The D2D communication may be over a direct D2D link between the source and destination D2D devices or over a locally routed D2D link between the source and destination D2D devices.

Direct D2D Link: As used herein, a direct D2D link is a link between a source D2D device and a target D2D device that does not pass through any intermediate nodes (i.e., the link is directly from the source D2D device to the target D2D device) (see FIG. 1 as an example).

Locally Routed D2D Link: As used herein, a locally routed D2D link is a link between a source D2D device and a target D2D device that passes through a common radio access node without passing through the core network (see FIG. 2 as an example).

Coordinating Node: As used herein, a coordinating node is a node that schedules, decides, at least in part, or selects time-frequency resources to be used for at least one of: cellular transmissions and D2D transmissions. The coordinating node may also provide the scheduling information to another node such as another D2D device, a cluster head, a radio network node such as an Evolved or Enhanced Node B (eNB), or a network node (e.g., a core network node).

Radio Spectrum: Although at least some of the embodiments are described for D2D transmissions in the uplink spectrum (e.g., Frequency Division Duplexing (FDD)) or uplink resources (e.g., Time Division Duplexing (TDD)), the embodiments disclosed herein are not limited to the usage of uplink radio resources, neither to licensed nor unlicensed spectrum, or any specific spectrum at all.

Cellular Network: A cellular network, which is interchangeably referred to herein as a cellular communications system, may comprise, e.g., a Long Term Evolution (LTE) network (e.g., FDD or TDD), a Universal Terrestrial Radio Access (UTRA) network, a Code Division Multiple Access (CDMA) network, WiMAX, a Global System for Mobile Communications (GSM) network, or any network employing any one or more Radio Access Technologies (RATs) for cellular operation. The description of many of the embodiments provided herein focuses on LTE and, as such, LTE terminology is oftentimes used; however, the embodiments described herein are not limited to the LTE RAT.

RAT: Example RATs include, e.g., LTE, GSM, CDMA, Wideband CDMA (WCDMA), WiFi, Wireless Local Area Network (WLAN), WiMAX, etc.

Figure 2:
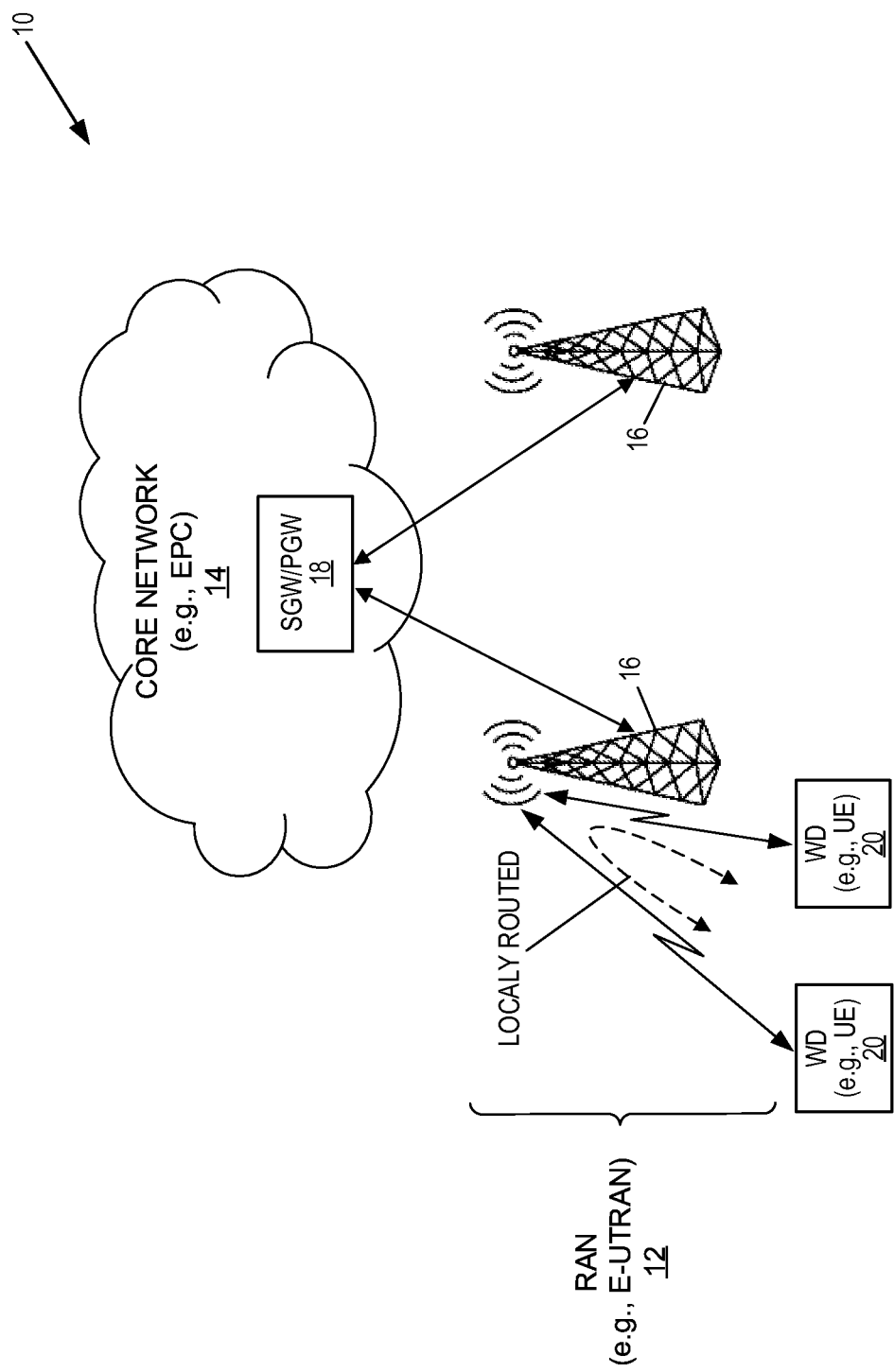
FIG. 2 illustrates locally routed D2D communication between two wireless devices via a locally routed D2D link in a cellular communications system.
Figure 3:
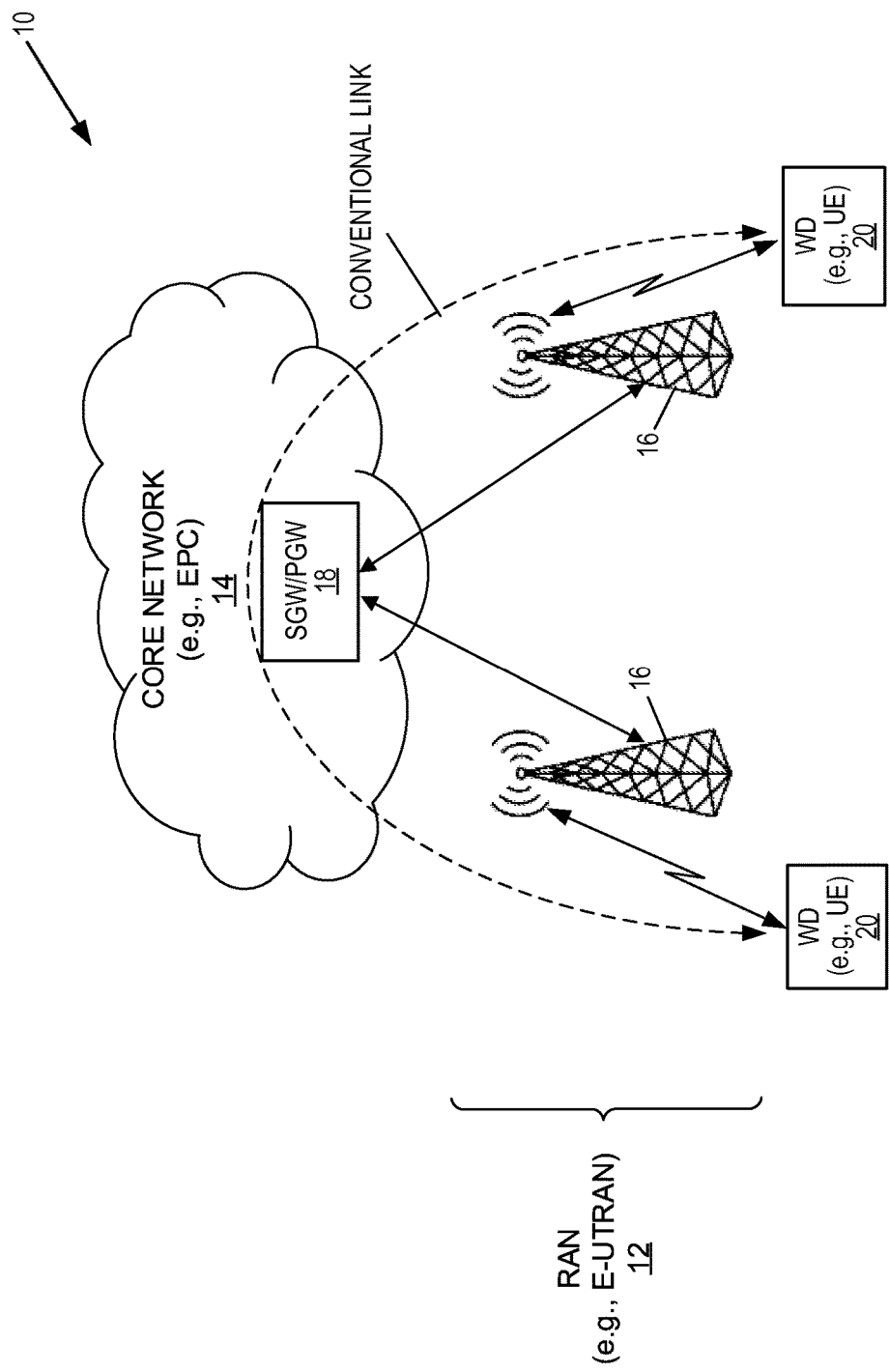
FIG. 3 illustrates conventional cellular communication between two wireless devices in a cellular communications system.

FIGS. 1 and 2 illustrate examples of D2D communication in a cellular communications system 10. In contrast, FIG. 3 illustrates conventional communication between two wireless devices in the cellular communications system 10. Specifically, as illustrated in FIGS. 1 through 3, the cellular communications system 10 includes a Radio Access Network (RAN) 12 (e.g., an Evolved or Enhanced Universal Terrestrial Radio Access Network (E-UTRAN)) and a core network 14 (e.g., an Evolved or Enhanced Packet Core (EPC)). The RAN 12 includes a number of base stations 16, which in $3^{rd}$ Generation Partnership Project (3GPP) LTE are eNBs. Note that the base stations 16 are only examples of nodes in the RAN 12, which are referred to herein as radio network nodes or radio access nodes. Other examples of radio network nodes include Remote Radio Heads (RRHs), etc. The core network 14 includes a number of core network nodes, which in this example include a Serving Gateway (SGW)/Packet, or Packet Data Network, Gateway (PGW) 18.

FIG. 1 illustrates direct D2D communication between two wireless devices 20 (e.g., UEs) via a direct D2D link. In contrast, FIG. 2 illustrates locally routed D2D communication between the two wireless devices 20 via a locally routed D2D link. As shown, the locally routed D2D communication is routed through the base station 16 without passing through the core network 14. In other words, a D2D transmission from one of the wireless devices 20 is transmitted from that wireless device 20 to the base station 16 and then transmitted from the base station 16 to the other wireless device 20 without passing through the core network 14. In contrast to the D2D communication of FIGS. 1 and 2, FIG. 3 illustrates conventional cellular communication between the two wireless devices 20 where a transmission from the source wireless device 20 is transmitted from the source wireless device 20 to the base station 16 serving the source wireless device 20, from the base station 16 serving the source wireless device 20 through the core network 14 to the base station 16 serving the target or destination wireless device 20, and then from the base station 16 serving the target or destination wireless device 20 to the target/destination wireless device 20.

Figure 4:
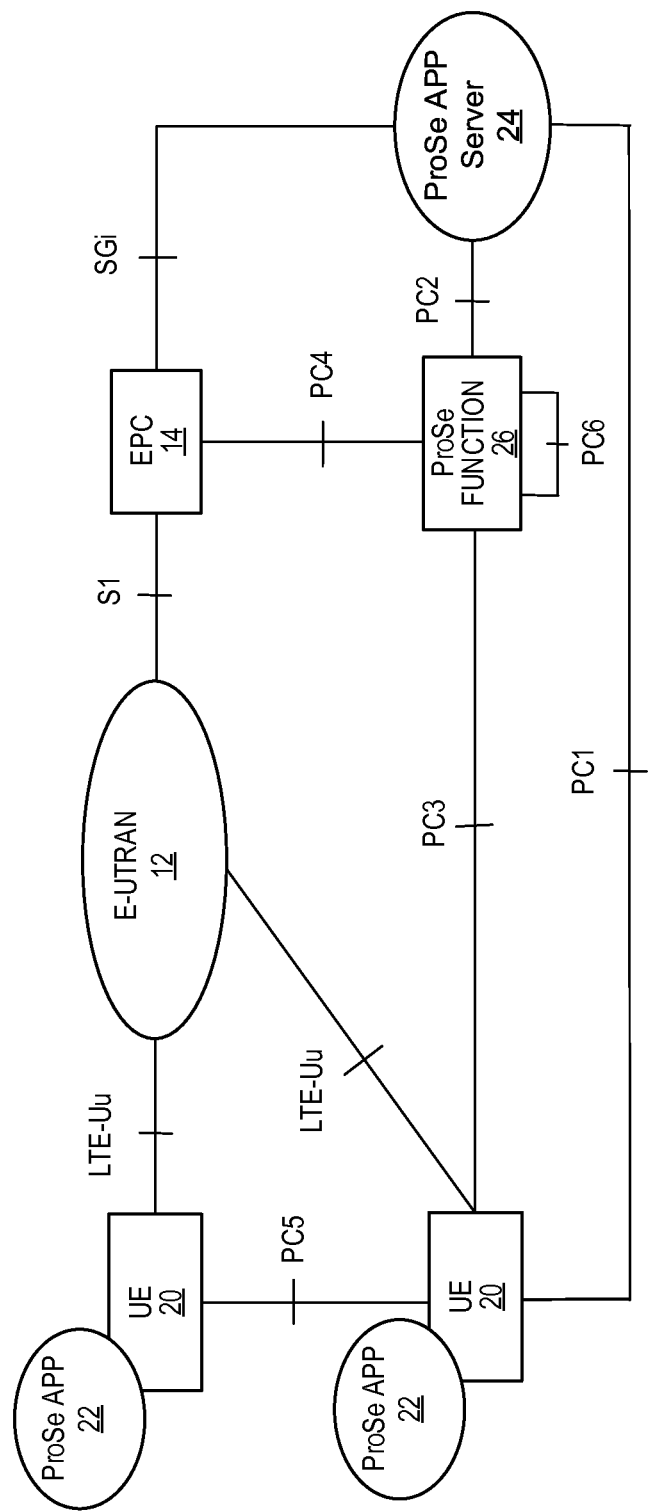
FIG. 4 illustrates one example of a D2D architecture for a cellular communications system.

An example of a D2D architecture including the interfaces between the various nodes is illustrated in FIG. 4. In this example, the architecture is a 3GPP LTE architecture and, as such, LTE terminology is used. As illustrated, the UEs 20 are connected to the E-UTRAN 12 via corresponding LTE-Uu interfaces. The E-UTRAN 12 is connected to the EPC 14 via an S1 interface. The UEs 20 include ProSe Applications (APPs) 22 that enable D2D communication between the UEs 20 via a direct D2D link. This direct D2D link is provided via an interface referred to in FIG. 4 as a PC5 interface. The direct D2D link may use uplink time and/or frequency resources of the E-UTRAN 12, downlink time and/or frequency resources of the E-UTRAN 12, or time and/or frequency resources that are not utilized by the E-UTRAN 12 (e.g., an unlicensed spectrum). In this example, one of the UEs 20 is also connected to a ProSe APP server 24 and a ProSe function 26 via interfaces referred to in FIG. 4 as PC1 and PC3 interfaces, respectively. The ProSe APP server 24 and the ProSe function 26 may provide server-side functionality related to the D2D communication between the UEs 20. In some embodiments, the communication for the PC1 and PC3 interfaces is transported over the E-UTRAN 12 and the EPC 14 but is transparent to the E-UTRAN 12 and the EPC 14. The EPC 14 is connected to the ProSe APP server 24 via a SGi interface and connected to the ProSe function 26 via a PC4 interface. The ProSe APP server 24 and the ProSe function 26 are connected via a PC2 interface. Lastly, the ProSe function 26 may use a PC6 interface for communication between internal components of the ProSe function 26.

Systems and methods are disclosed herein for enabling, or at least improving, D2D operation and services in a cellular communications system, such as the cellular communications system 10 of, in particular, FIGS. 1 and 2. Note that the embodiments described herein may be combined with each other in any way.

Before describing embodiments of the present disclosure, a discussion of some problems with existing D2D solutions is beneficial. Deployment of a new network node functionality, for instance, capability for D2D support, is typically made in a gradual fashion, for instance when a certain maintenance action for certain network nodes is needed. Hence, in the cellular communications system 10 as an example, different nodes (e.g., different wireless devices 20, different radio access nodes such as different base stations 16, and/or different core network nodes such as different SGWs/PGWs 18) may have different functionality. For example, some of the nodes may have D2D functionality while other nodes may not have D2D functionality. In case of, for example, enhanced cellular performance, different network node capability may only be seen as different throughput performance from an end user perspective. However, introduction of new services like network-assisted D2D communication may imply that D2D services are only possible in a subset of the network nodes (e.g., a subset of the radio network nodes (e.g., a subset of the base stations 16) and/or a subset of the core network nodes (e.g., a subset of the SGWs/PGWs 18)), and it is important that devices have such knowledge. Currently, the D2D related capability of radio network nodes is not obtained and not utilized by wireless devices that are involved or may potentially be interested in D2D operation. Furthermore, another network node may need to be aware of the radio network node's ability to support D2D operation between devices, but obtaining such capability of the other network node is not possible.

For instance, if one of the wireless devices 20 is interested in D2D operation, the wireless device 20 may need to be aware of which radio network nodes (e.g., which base station(s) 16) are capable of D2D operation in general or of a specific D2D related capability or service, even if the radio network node does not take another device role (i.e., does not engage into direct D2D communication with the wireless device 20). Using conventional systems and methods, a wireless device 20 can discover other wireless devices 20 interested in D2D communication, but is not aware of the capability of, e.g., the radio network nodes to support D2D operation between the wireless devices 20, which may be particularly important for network-assisted D2D operation between the wireless devices 20. Hence, there is a need for signaling methods, apparatus, and support of network node (e.g., radio network node) D2D capability.

Figure 5:
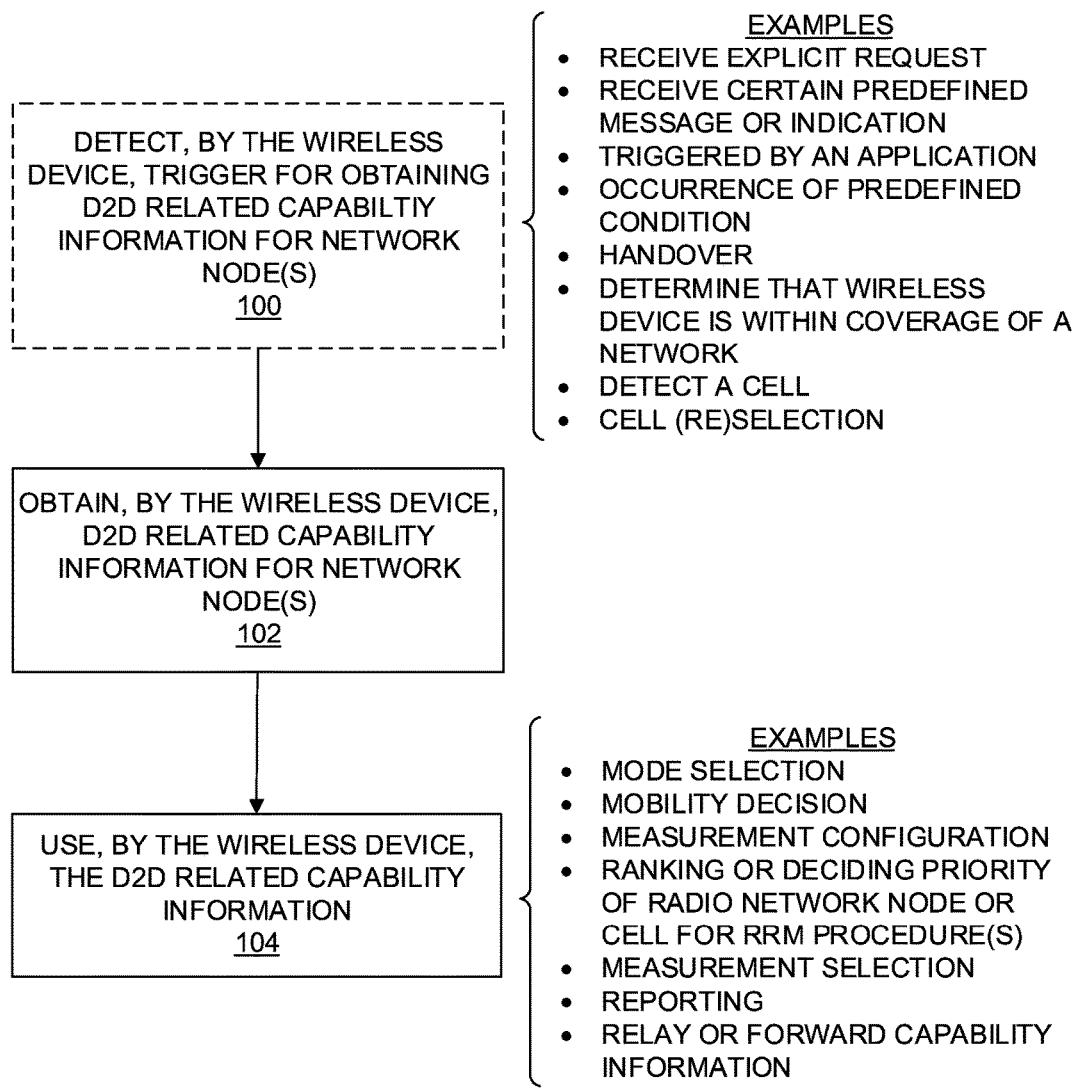
FIG. 5 is a flow chart that illustrates the operation of a wireless device to obtain D2D related capability information for one or more network nodes and use the D2D related capability information according to some embodiments of the present disclosure.

In this regard, systems and methods are disclosed herein that enable the wireless devices 20 to obtain, and the network nodes to provide, D2D related capability information for at least some of the network nodes in the cellular communications system 10. FIG. 5 is a flow chart that illustrates the operation of one of the wireless devices 20 to obtain D2D related capability information for one or more network nodes and use the D2D related capability information according to some embodiments of the present disclosure.

The network node(s) may be a radio network node(s) and/or another network node(s). Some examples of the radio network node are a radio base station (e.g., the base station 16), a relay node, an access point, a cluster head, etc. The radio network node is comprised in a wireless communications network (e.g., the cellular communications system 10) and may also support cellular operation. Some examples of a network node which is not a radio network node include a core network node, a Self-Organizing Network (SON) node, an Operations and Management (O&M) node, a positioning node, a server, an application server, a D2D server (which may be capable of some but not all D2D related features), an external node, or a node comprised in another network.

Before proceeding, it should be noted that, as used herein, D2D related capability information for a network node (e.g., a radio network node or some other network node) may comprise one or more of:

information indicative of the ability of the network node to support, assist a wireless device 20 in, or be engaged in one or more D2D activities, where the one or more D2D activities may include, e.g.:
    transmitting radio signals or channels associated with D2D operation such as D2D synchronization signals, channels in the uplink spectrum, D2D control channels, or D2D data channels;
    providing to a wireless device 20 assistance data related to D2D operation;
    broadcasting data associated with D2D operation;
    providing control data associated with D2D operation to a wireless device 20 and/or another network node;
    supporting D2D communication;
    supporting D2D discovery; and
    ability to operate as a D2D controlling node or a D2D cluster head for one or more wireless devices 20;
information indicative of the ability of the network node to support, assist a wireless device 20 in, or be engaged in one or more D2D activities such as those described above on a certain carrier frequency or in a certain frequency band;
information indicative of the ability of the network node to support, assist a wireless device 20 in, or be engaged in one or more D2D activities such as those described above in one or more specific RATs such as, e.g., FDD LTE, TDD LTE, WCDMA, GSM, CDMA, WiMAX, WLAN, etc.;
information indicative of the ability of the network node to support, assist a wireless device 20 in, or be engaged in one or more D2D activities such as those described above within a certain bandwidth;
information indicative of the ability of the network node to support, assist a wireless device 20 in, or be engaged in one or more D2D activities of a certain type, for a certain purpose, for a certain application, or for a certain service type, e.g.:
   for public safety;
   for commercial use;
   for virtual money bank operation;
   for voice service;
   supporting at least broadcast D2D communication;
   supporting at least D2D group communication;
   supporting at least D2D unicast communication;
   supporting at least D2D discovery; and
   advanced mode of D2D operation (compared to a basic mode of D2D operation, i.e., with a more restricted functionality);
information indicative of the ability of the network node to support, assist a wireless device 20 in, or be engaged in one or more D2D activities for a certain type of wireless devices 20 or wireless devices 20 with certain characteristics (e.g., wireless devices 20 of a certain category or of a certain power class);
information indicative of the ability of the network node to support a certain type of scheduling for D2D activities (e.g., dynamic D2D data scheduling, semi-persistent D2D data scheduling, etc.);
information indicative of the number of D2D links, D2D connections, or D2D sessions the network node may be able to handle (particularly, in network-assisted D2D operation); and
information indicative of the ability of the network node to obtain D2D related capability information for another network or provide D2D related capability information for itself for another network node.

As illustrated in FIG. 5, in some embodiments (i.e., optionally), the wireless device 20 detects a trigger for obtaining (i.e., starting obtaining) D2D related capability information for one or more network nodes (step 100). As used herein, D2D related capability information "for" a network node is information related to D2D capabilities of that network node. While any suitable trigger may be used, in some embodiments, the wireless device 20 may start obtaining D2D related capability information for a network node (e.g., a radio network node) in response to, for example, any one or more of the following:
   upon receiving an explicit request for such capability from another node (i.e., a network node other than the network node(s) for which the D2D related capability information is to be obtained) or another wireless device 20;
   upon receiving a certain predefined message or an indication from another network node, i.e., a network node other than the network node(s) for which the D2D related capability information is to be obtained) or from another wireless device 20;
   upon triggering by an application;
   upon a certain condition (e.g., a quality of cellular operation is below a threshold);
   for embodiments where the network node is a radio network node (e.g., the base station 16):
      upon handover to the network node;
      upon determining that the wireless device 20 is within coverage of a radio communications network (e.g., the RAN 12) comprising the radio network node;
      upon detecting a cell (e.g., based on a cell search, i.e., detecting a Primary Synchronization Signal (PSS)/Secondary Synchronization Signal (SSS)) associated with the radio network node; and
      for the purpose of cell selection or cell reselection.

The wireless device 20 then obtains the D2D related capability information for the one or more network nodes (step 102). The manner in which the wireless device 20 obtains the D2D related capability information may vary. Further, while examples are given below, the D2D related capability information may be obtained using any suitable technique. In particular, the wireless device 20 may obtain the D2D related capability information for the network node(s) in one or more ways such as, for example, higher layer signaling, physical layer signaling, reading data stored or preconfigured in the wireless device 20, reading data from an external database or media, determining the D2D related capability information for the network node(s) based on measurement(s), and/or determining the D2D related capability information for the network node(s) based on a predefined rule(s).

More specifically, with respect to higher layer signaling (i.e., signaling at a protocol layer higher than the physical layer), the wireless device 20 may obtain the D2D related capability information for the network node(s) via higher layer signaling from the network node(s) itself (themselves), from another network node, or from another wireless device 20. For example, the wireless device 20 may obtain the D2D related capability information for a network node via Radio Resource Control (RRC) or Secure User Plane Location (SUPL) protocol signaling from the network node itself in the scenario where the network node is a radio network node (e.g., the base station 16), from another network node (e.g., another radio network node), or another wireless device 20 (e.g., another wireless device 20 forwarding the D2D related capability information of the network node(s) or signaling the obtained D2D related capability information of the network node(s)). The D2D related capability information may be explicitly indicated or comprised implicitly, e.g., via broadcast, multicast, or dedicated signaling.

The node from which the wireless device 20 receives such signaling is referred to herein as a signaling node. The signaling node may signal its own D2D related capability information and/or the D2D related capability information for another network node(s), e.g., typically adjacent or nearby nodes. In one example, the signaling node may provide to the wireless device 20 a list of radio network nodes in its neighborhood that have one or more D2D capabilities, where the list may comprise identities associated with the radio network nodes or cells. In another example, the signaling node may provide to the wireless device 20 a list of radio network nodes in its neighborhood that do not have a certain D2D capability, where the list may comprise identities associated with the radio network nodes or cells. In yet another example, the D2D related capability information or an indication thereof may be comprised in node-specific, cell-specific, or system-specific information (e.g., System Information (SI)) signaled (e.g., broadcasted via a physical broadcast channel) by the radio network node. Further, the higher layer signaling may be, for example, broadcast, multicast, or dedicated signaling. Example methods in a network node for providing the network node's own or another node's D2D related capability are also described below.

With regard to obtaining the D2D related capability information via physical layer signaling, the wireless device 20 may obtain the D2D related capability information via physical layer signaling (e.g., an indication bit(s) on a physical channel(s)) from the network node(s) itself (themselves) in the scenario where the network node(s) is(are) a radio network node(s), another network node, or another wireless device 20). A particular D2D related capability may be explicitly indicated or comprised implicitly. Further, the physical layer signaling may be, for example, broadcast, multicast, or dedicated signaling. Example methods in a network node for providing the network node's own or another node's D2D related capability are also described below.

With regard to obtaining the D2D related capability information by reading data stored or preconfigured in local or external storage, the wireless device 20 may obtain the D2D related capability information by reading corresponding data stored or preconfigured in the wireless device 20 (e.g., from an internal database, subscription configuration, etc.) or by reading corresponding data from an external database or media.

With regard to determining the D2D related capability information based on measurements, the wireless device 20 may obtain the D2D related capability information by performing measurement(s) on known signal(s) and then determine the D2D related capability information based on the measurement(s). For example, if the network node(s) include a radio network node and a known radio signal associated with D2D operation is transmitted by the radio network node, it may be assumed that the radio network node has one or more of the D2D related capabilities. As another example, the wireless device 20 may perform the measurements with respect to searching for synchronization signals indicative of D2D related capability (e.g., extended synchronization sequences such as PSS and/or SSS sequences used for D2D operations in the downlink or uplink spectrum). If such signals are detected, then it may be assumed that the transmitting radio network node has one or more D2D related capabilities. In an explicit example, SSS subsequence combinations currently not allocated may be used for signaling certain network node D2D capability. Hence, in this case, the wireless device 20 not only determines the cell group but also actual D2D capability for that particular radio network node. In one embodiment, the extended SSSs are transmitted in certain subframes (i.e., as extensions to legacy PSS/SSS).

Lastly, with regard to determining the D2D related capability information for the network node(s) based on a predefined rule(s), in one example, the wireless device 20 determines the D2D related capability information for a radio network node by applying a predefined rule to an identity associated with the radio network node when it is predefined that a certain set of identities is associated with/reserved for radio network nodes having D2D related capability.

Once the D2D related information for the network node(s) is obtained by the wireless device 20, the wireless device 20 uses the D2D related capability information (step 104). In particular, the wireless device 20 uses the D2D related capability information obtained for the network node(s) to perform one or more tasks. In general, the one or more tasks may include one or more operational tasks, one or more Radio Resource Management (RRM) related tasks, one or more mobility related tasks, one or more Minimization of Drive Tests (MDT) related tasks, one or more SON related tasks, one or more positioning related tasks, etc. For example, the task(s) performed by the wireless device 20 based on the D2D related capability information include one or more of the following:

selecting between at least any two of the following modes of operation for the wireless device 20: (a) a cellular operation mode (i.e., a normal non-D2D mode of operation), (b) a D2D operation mode, or (c) a specific D2D operation mode, e.g.:
  in a cell associated with a radio network node which has no or a limited D2D capability, the wireless device 20 may not operate in D2D operation mode with the radio network involvement; or a wireless device may operate in D2D operation which does not involve radio network nodes (e.g., not network-assisted but UE-based D2D operation);
making a decision for the wireless device 20 related to mobility, Public Land Mobile Network (PLMN) selection, RAT selection, cell selection, cell reselection, or handover (e.g., do not reselect or do not camp on cell without D2D capability);
if the network node(s) for which the D2D related information obtained by the wireless device 20 includes a radio network node:
  setting or selecting a measurement configuration for the wireless device 20 (e.g., initiating a D2D related measurement on radio signals transmitted by the radio network node);
  ranking or deciding a priority of the radio network node or a corresponding cell for one or more RRM procedures (e.g., for handover, for performing RRM measurements, for measurement ranking prior reporting, etc.);
  measurement selection for measurement logging and/or measurement reporting (e.g., the wireless device 20 may want to log and/or report measurements only for radio network nodes with D2D related capability);
  reporting to another node that the radio network node has a D2D related capability (e.g., reporting an identity associated with the radio network node upon a request from another node or in an unsolicited way); and
  relaying or forwarding all or at least a part of the radio network node's capability information to another node (e.g., another base station 16 or another wireless device 20).

Figure 6:
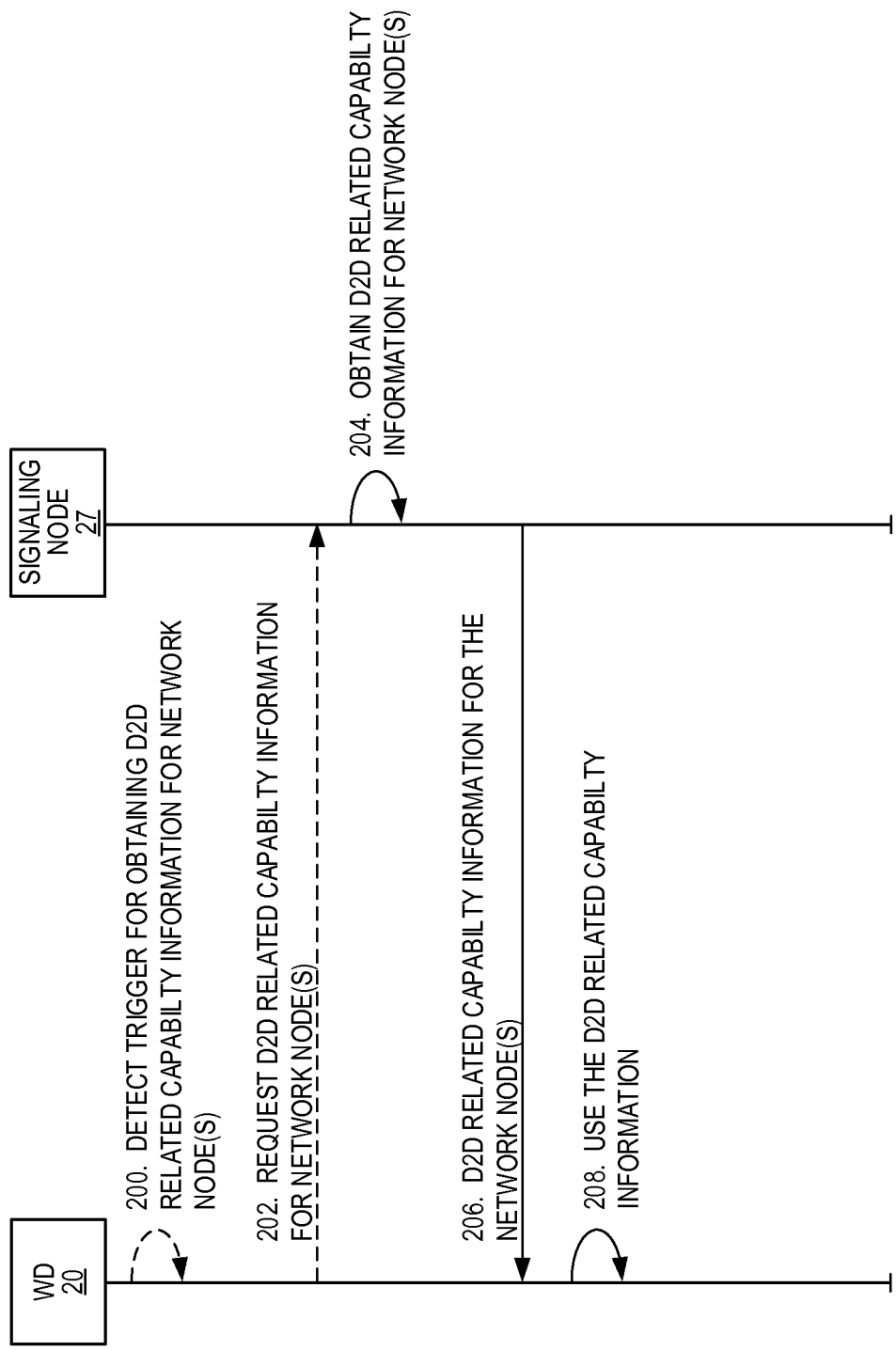
FIG. 6 illustrates an embodiment in which a wireless device obtains D2D related capability information for one or more network nodes via signaling.

FIGS. 6 through 9 illustrate examples of the methods of obtaining the D2D related capability information at the wireless device 20 according to some embodiments of the present disclosure. More specifically, FIG. 6 illustrates an embodiment in which the wireless device 20 obtains the D2D related capability information for the network node(s) via signaling (e.g., higher layer signaling or physical layer signaling), as discussed above. As illustrated, the wireless device 20 may, in some embodiments, detect a trigger for obtaining the D2D related capability information, as described above with respect to step 100 of FIG. 5 (step 200). In some embodiments, after detecting the trigger (e.g., in response to detecting the trigger), the wireless device 20 sends a request to a signaling node 27 for D2D related capability information (step 202). Again, this request is optional and is not required in all embodiments.

The signaling node 27 may be, for example, a radio access node (e.g., the base station 16). The signaling node 27 obtains D2D related capability information for one or more network nodes (step 204). The network node(s) include the signaling node 27 and/or other network nodes (e.g., other radio network nodes). As discussed below, the signaling node 27 may obtain the D2D related capability information using any suitable technique (e.g., signaling, reading data from internal or external storage, based on measurement(s) (e.g., detection of) known signal(s), predefined rule(s), or the like). The signaling node 27 signals the D2D related capability information for the one or more network nodes to the wireless device 20, as described above (step 206). As discussed above, this signaling may be, for example, higher layer signaling (e.g., RRC or SUPL signaling) or physical layer signaling. Further, the signaling may explicitly include the D2D related capability information or implicitly indicate the D2D related capability information. Further, the signaling may be broadcast signaling, multicast signaling, or dedicated signaling for the wireless device 20. The wireless device 20 then uses the D2D related capability information as described above with respect to step 104 of FIG. 5 (step 208).

Figure 7:
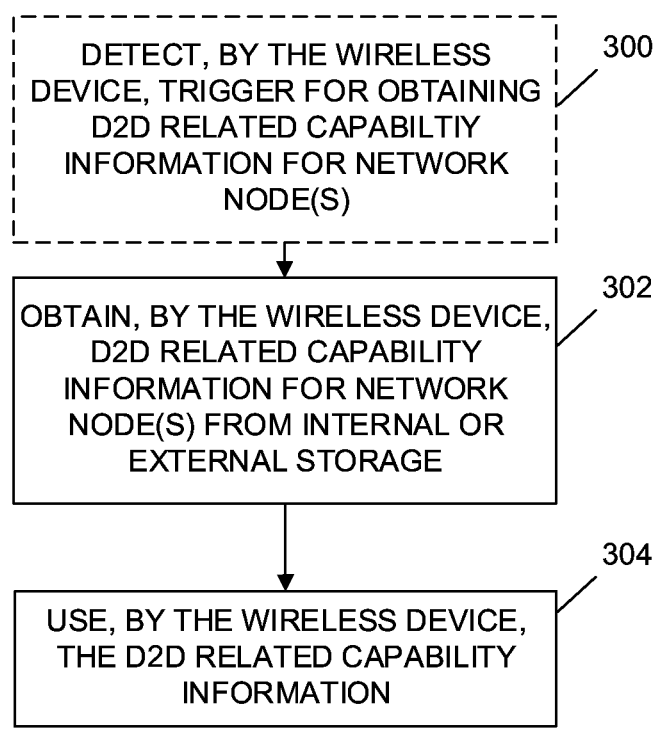
FIG. 7 illustrates an embodiment in which a wireless device obtains D2D related capability information for one or more network nodes by reading corresponding data from internal or external storage.

FIG. 7 illustrates an embodiment in which the wireless device 20 obtains the D2D related capability information for the network node(s) by reading corresponding data from internal or external storage, as described above. As illustrated, the wireless device 20 may, in some embodiments, detect a trigger for obtaining the D2D related capability information, as described above with respect to step 100 of FIG. 5 (step 300). The wireless device 20 then obtains the D2D related capability information for one or more network nodes from internal or external storage (step 302). More specifically, in some embodiments, the wireless device 20 reads data corresponding to or indicative of the D2D related capability of one or more network nodes from internal or external storage. The data may be read from, for example, an internal database of the wireless device 20, a subscription configuration of the wireless device 20, or the like. Alternatively, the data may be read from an external database or media that is accessible to the wireless device 20. The wireless device 20 then uses the D2D related capability information as described above with respect to step 104 of FIG. 5 (step 304).

Figure 8:
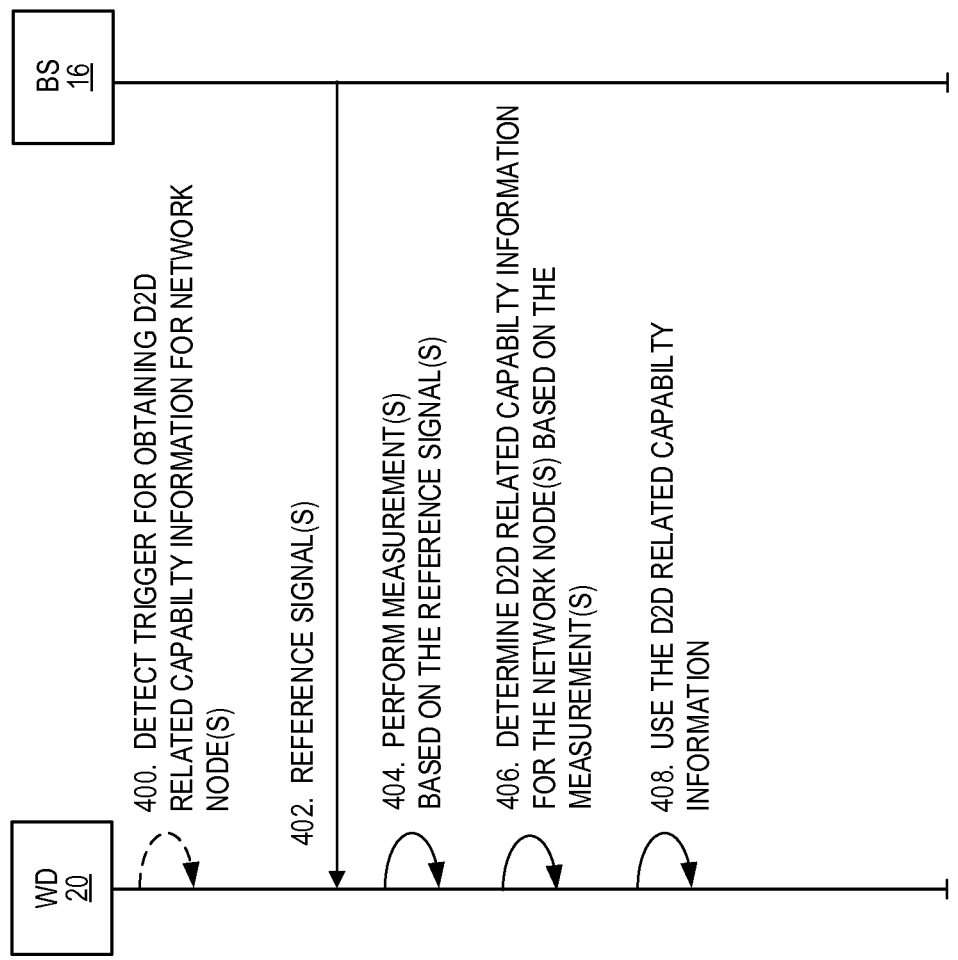
FIG. 8 illustrates an embodiment in which a wireless device obtains D2D related capability information for one or more network nodes by determining the D2D related capability information based on measurement(s) of known signal(s)

FIG. 8 illustrates an embodiment in which the wireless device 20 obtains the D2D related capability information for the network node(s) by determining the D2D related capability information based on measurement(s) of known signal(s) as discussed above. As illustrated, the wireless device 20 may, in some embodiments, detect a trigger for obtaining the D2D related capability information, as described above with respect to step 100 of FIG. 5 (step 400). In some embodiments, after detecting the trigger (e.g., in response to detecting the trigger), the wireless device 20 performs measurements on one or more known signals.

More specifically, in this example, the base station 16 transmits one or more reference signals to the wireless device 20 (step 402). The reference signals are any signals known to the wireless device 20. Some examples are synchronization sequences such as PSS and/or SSS. However, the reference signal(s) are not limited to PSS and SSS. The wireless device 20 performs one or more measurements on the one or more reference signals (step 404) and, based on the measurement(s), determines the D2D related capability information for the one or more network nodes (e.g., the base station 16) (step 406). In some embodiments, the wireless device 20 performs the measurement(s) to determine whether a particular known radio signal associated with D2D operation is transmitted by the base station 16. If so, the wireless device 20 determines that the base station 16 has one or more predefined (e.g., preconfigured) D2D related capabilities. In other embodiments, the wireless device 20 uses the measurement(s) to search for synchronization signals indicative of D2D related capability (e.g., extended synchronization sequences such as PSS and/or SSS sequences used for D2D operations in the downlink or uplink spectrum), as discussed above. Once the wireless device 20 has determined the D2D related capability information, the wireless device 20 uses the D2D related capability information as described above with respect to step 104 of FIG. 5 (step 408).

Figure 9:
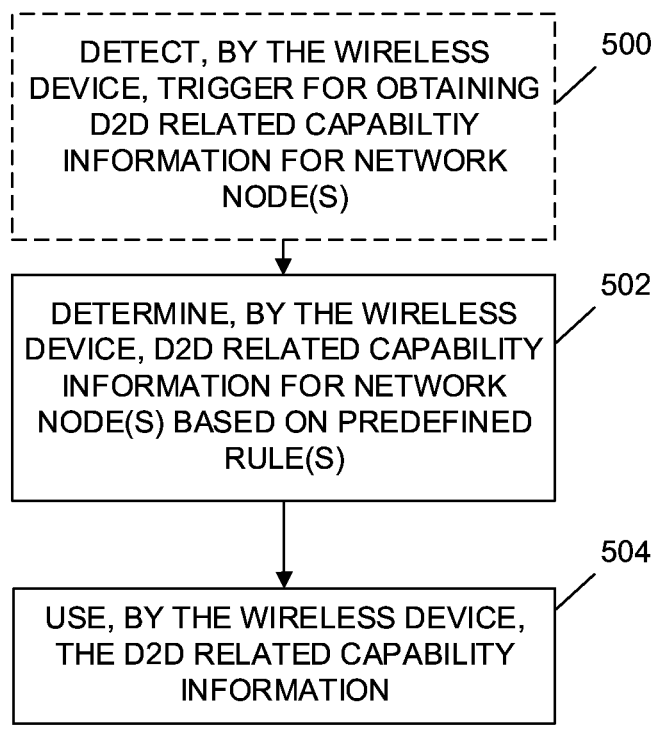
FIG. 9 illustrates an embodiment in which a wireless device obtains D2D related capability information for one or more network nodes by determining the D2D related capability information based on one or more predefined rules.

FIG. 9 illustrates an embodiment in which the wireless device 20 obtains the D2D related capability information for the network node(s) by determining the D2D related capability information based on one or more predefined rules, as described above. As illustrated, the wireless device 20 may, in some embodiments, detect a trigger for obtaining the D2D related capability information, as described above with respect to step 100 of FIG. 5 (step 500). The wireless device 20 then determines D2D related capability information for one or more network nodes based on one or more predefined rules (step 502). The one or more predefined rules may be any predefined rule(s) that enable the wireless device 20 to determine the D2D related capability information of network node(s) (e.g., a radio network node such as the base station 16) based on information that is available to the wireless device 20. For example, the wireless device 20 may determine the D2D related capability information of a radio network node (e.g., the base station 16) based on an identify of the radio network node (or an identity of a cell served by the radio network node) and a predefined rule that states that a predefined set of identities are associated with or reserved for radio network nodes having one or more predefined D2D related capabilities. Further, different sets of identities may be predefined for different D2D related capabilities or different sets of D2D related capabilities. The wireless device 20 then uses the D2D related capability information as described above with respect to step 104 of FIG. 5 (step 504).

The embodiments thus far have related primarily to the wireless device 20 obtaining D2D related capability information for network node(s). FIGS. 10 through 18 relate to embodiments that focus on the operation of a network node to obtain D2D related capability information for itself and/or other network nodes and, in some embodiments, provide that D2D related capability information to the wireless device(s) 20. These embodiments can be combined with the embodiments described above relating to the operation of the wireless device 20 to obtain and use the D2D related capability information.

In particular, in some embodiments, a first network node signals (e.g., upon a request, upon a triggering condition, or in an unsolicited way) to one or more wireless devices 20:
- one or more D2D related capabilities of the first network node or an indication thereof; and/or
- one or more of D2D related capabilities of a radio network node (different from the first network node) or an indication thereof; and/or
- a list of one or more other network nodes (e.g., radio network nodes, cluster heads, core network nodes, or external nodes) with one or more of D2D related capabilities, where the list comprises, e.g., identifications associated with the other network nodes.

The D2D related capability information may be provided via a physical radio interface and/or via a logical connection, with no or at least one intermediate node. The wireless device 20 receiving this D2D related capability information may further use it for one or more operational tasks, e.g., such as those described above.

Some examples of the first network node are a radio network node (e.g., a radio base station, an access point, a cluster head, etc.), a core network node, a SON node, an O&M node, a positioning node, a server, an application server, a D2D server (which may be capable of some but not all D2D related features), an external node, or a node comprised in another network. Further, the signaling may be via logical or physical links and may comprise higher layer signaling or physical layer signaling. Also, a request for the D2D related capability in some embodiments may be received from the wireless device 20 or from another node. The D2D related capability information may be provided in response to this request.

Figure 10:
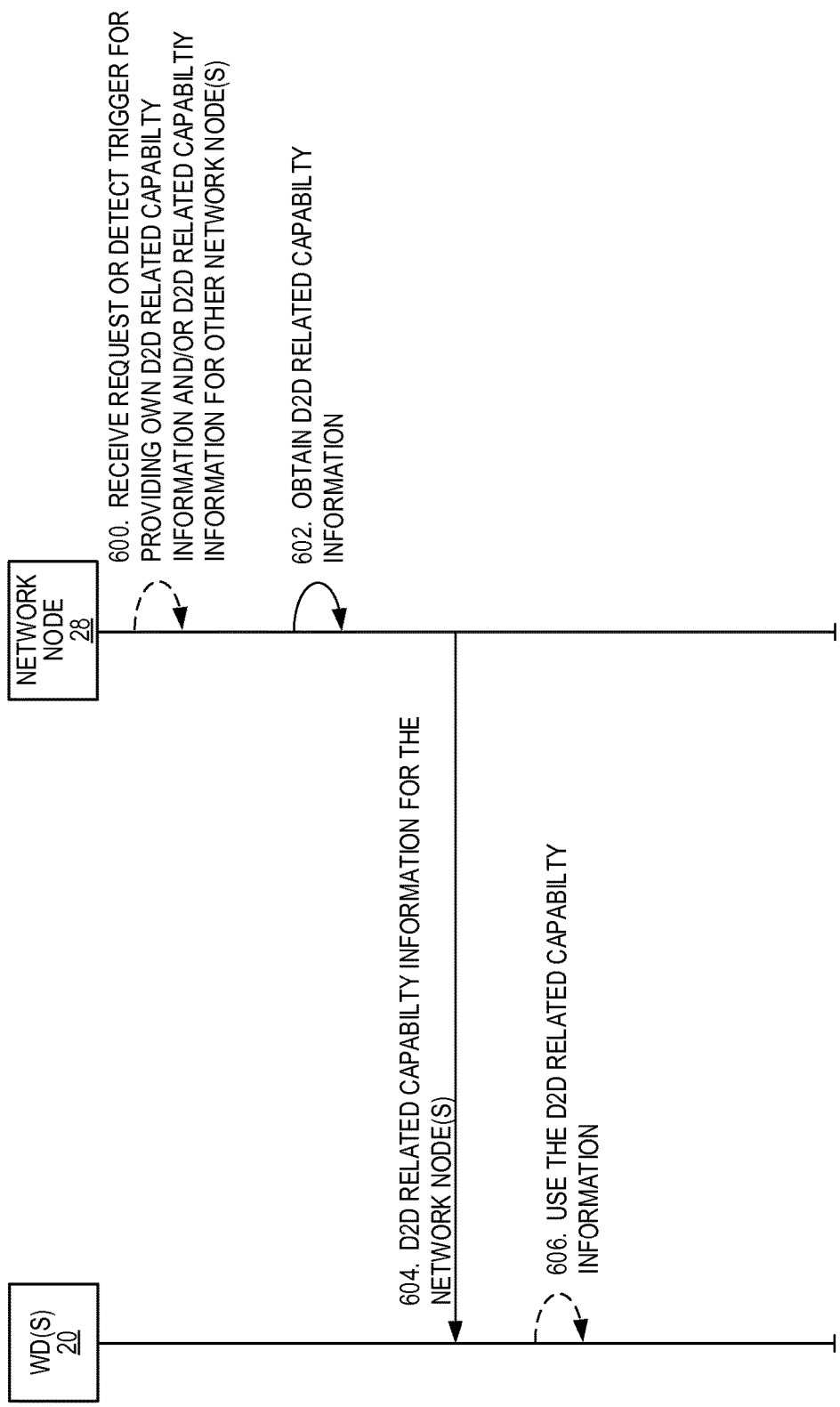
FIG. 10 illustrates the operation of a network node to obtain and provide D2D related capability information for itself and/or one or more other network nodes according to some embodiments of the present disclosure.

In this regard, FIG. 10 illustrates the operation of a network node 28 to obtain and provide D2D related capability information for itself and/or one or more other network nodes according to some embodiments of the present disclosure. The network node 28 may be any radio network node (e.g., the base station 16) or any core network node (e.g., the SGW/PGW 18). As illustrated, in some embodiments (optionally), the network node 28 receives a request or detects a trigger for providing its own D2D related capability information and/or D2D related capability information for one or more other network node(s) (step 600). Such a request may be received from, for example, the wireless device 20 desiring the D2D related capability information, but is not limited thereto.

The network node 28 obtains its own D2D related capability information and/or the D2D related information for the other network node(s) (step 602). The network node 28 may obtain its own D2D related capability information from, e.g., internal storage of the network node 28 or external storage accessible to the network node 28. The network node 28 may obtain the D2D related capability information of the other network node(s) in any suitable manner. For example, the network node 28 may request D2D related capability information from the other network node(s), receive the D2D related capability information from the other network node(s) via signaling (e.g., higher layer signaling, physical layer signaling, broadcast, multicast, or dedicated signaling), determine the D2D related capability information for the other network node(s) by performing measurement(s) on known signals (e.g., determining whether known signal(s) indicative of one or more predefined D2D related capabilities are transmitted by other radio network nodes), determining the D2D related capability information based on one or more predefined rules, obtaining the D2D related capability information of the other network node(s) from wireless device(s) 20 that themselves have obtained the D2D related capability information from the other network node(s), etc.

The network node 28 then provides the D2D related capability information for itself and/or the other network node(s) to the wireless device(s) 20 (step 604). The D2D related capability information may be provided to the wireless device 20 via broadcast, multicast, or dedicated signaling, as discussed above. As discussed above, the D2D related capability information may be provided to the wireless device(s) 20 by providing the actual D2D related capability information to the wireless device(s) 20 or by providing an indication of the actual D2D related capability information to the wireless device(s) 20. While not necessary for this embodiment, the wireless device(s) 20 may then use the D2D related capability information as described above (step 606).

According to other embodiments, a first network node signals (e.g., upon a request, upon a triggering condition, or in an unsolicited way) to a second network node (e.g., another base station 16, a cluster head, a core network node, a node with a D2D function, or a physical or logical node acting as a D2D server):
  one or more of the D2D related capabilities of the first network node or an indication thereof; and/or
  one or more of D2D related capabilities of a radio network node (different from the first network node) or an indication thereof; and/or
  a list of one or more other network nodes (e.g., radio network nodes, core network nodes, or external nodes) with one or more of D2D related capabilities, where the list comprises, e.g., identifications associated with the other network nodes.

The D2D related capability information may be provided via a physical interface and/or via a logical connection, with no or at least one intermediate node. The other network node(s) receiving this capability information may further use it for one or more operational tasks, e.g., similar to those described above with respect to the wireless device(s) 20.

Some examples of the first and second network nodes are a radio network node (e.g., a radio base station, an access point, a cluster head, etc.), a core network node, a SON node, an O&M node, a positioning node, a server, an application server, a D2D server (which may be capable of some but not all D2D related features), an external node, or a node comprised in another network. Further, the signaling may be via logical or physical links and may comprise higher layer signaling or physical layer signaling. Also, a request for the D2D related capability information in some embodiments may be received from the wireless device 20, from the second network node, or from another node. The D2D related capability information may be provided in response to this request.

Figure 11:
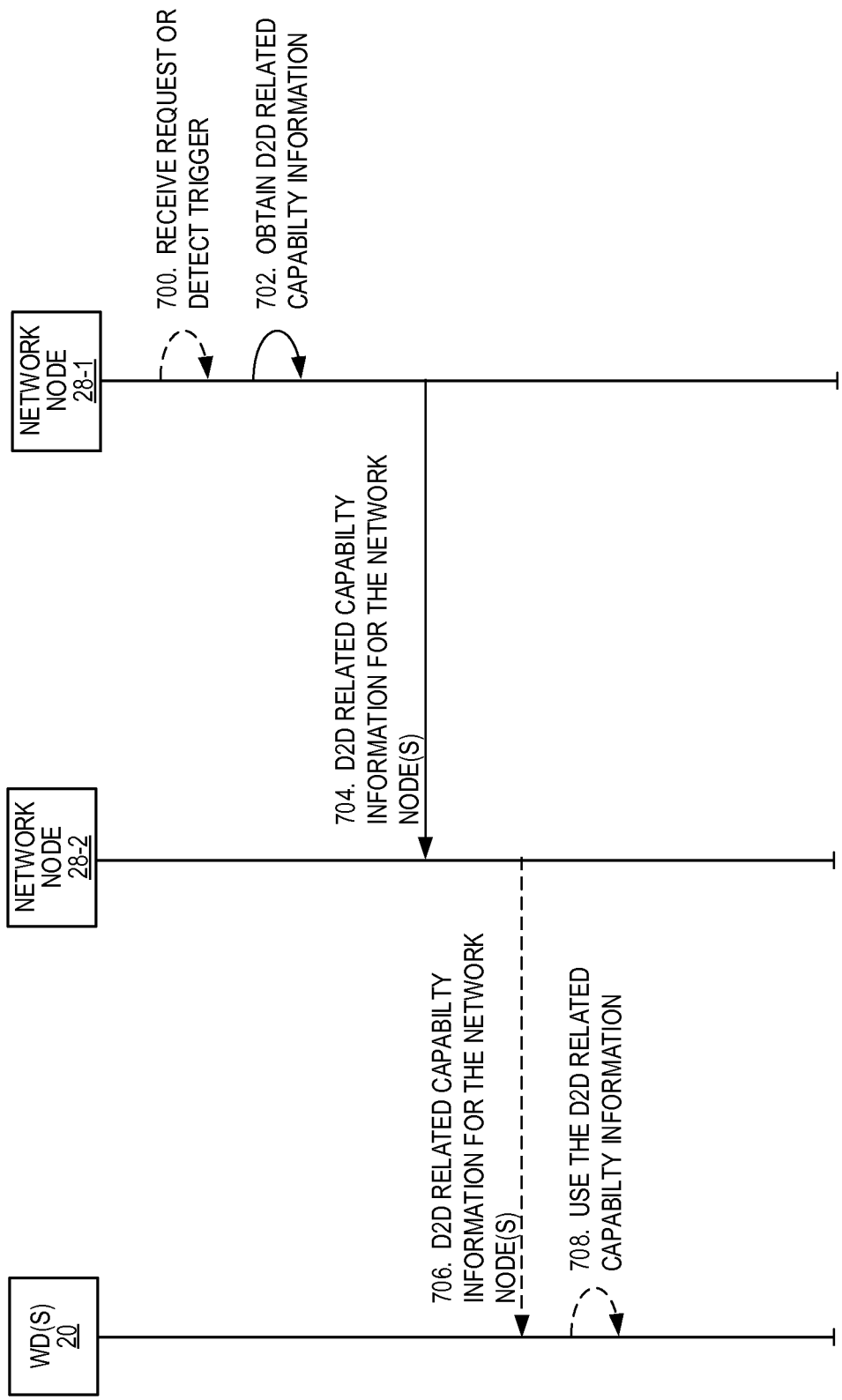
FIG. 11 illustrates the operation of a network node to obtain and provide D2D related capability information for itself and/or one or more other network nodes according to some other embodiments of the present disclosure.

In this regard, FIG. 11 illustrates the operation of a network node 28 (which is referred to in FIG. 11 specifically as network node 28-1) to obtain and provide D2D related capability information for itself and/or one or more other network nodes to another network node 28-2 according to some embodiments of the present disclosure. The network node 28-1 may be any radio network node (e.g., the base station 16) or any core network node (e.g., the SGW/PGW 18). Likewise, the network node 28-2 may be any radio network node (e.g., the base station 16) or any core network node (e.g., the SGW/PGW 18). As illustrated, in some embodiments (optionally), the network node 28-1 receives a request or detects a trigger for providing its own D2D related capability information and/or D2D related capability information for one or more other network node(s) (step 700). Such a request may be received from, for example, the network node 28-2 desiring the D2D related capability information, but is not limited thereto.

The network node 28-1 obtains its own D2D related capability information and/or the D2D related information for the other network node(s) (step 702). The network node 28-1 may obtain its own D2D related capability information from, e.g., internal storage of the network node 28-1 or external storage accessible to the network node 28-1. The network node 28-1 may obtain the D2D related capability information of the other network node(s) in any suitable manner. For example, the network node 28-1 may request D2D related capability information from the other network node(s), receive the D2D related capability information from the other network node(s) via signaling (e.g., higher layer signaling, physical layer signaling, broadcast, multicast, or dedicated signaling), determine the D2D related capability information for the other network node(s) by performing measurement(s) on known signals (e.g., determining whether known signal(s) indicative of one or more predefined D2D related capabilities are transmitted by other radio network nodes), determining the D2D related capability information based on one or more predefined rules, obtaining the D2D related capability information of the other network node(s) from wireless device(s) 20 that themselves have obtained the D2D related capability information from the other network node(s), etc.

The network node 28-1 then provides the D2D related capability information for itself and/or the other network node(s) to the network node 28-2 (step 704). The network node 28-2 may then use the D2D related capability information to perform one or more operational tasks (e.g., one or more operational tasks similar to those described above with respect to the wireless device(s) 20). However, in this particular example, the network node 28-2 may, in some embodiments, provide the D2D related capability information obtained in step 704 and, in some embodiments, its own D2D related capability information to the wireless device(s) 20 (step 706). As discussed above, the D2D related capability information may be provided to the wireless device(s) 20 via broadcast, multicast, or dedicated signaling, as discussed above. As also discussed above, the D2D related capability information may be provided to the wireless device(s) 20 by providing the actual D2D related capability information to the wireless device(s) 20 or by providing an indication of the actual D2D related capability information to the wireless device(s) 20. While not necessary for this embodiment, the wireless device(s) 20 may then use the D2D related capability information as described above (step 708).

In yet another embodiment, a first network node multicasts or broadcasts via the cellular air interface:
 one or more of the D2D related capabilities of the first network node or an indication thereof; and/or
 one or more of D2D related capabilities of a radio network node (different from the first network node) or an indication thereof; and/or
 a list of one or more other network nodes (e.g., radio network nodes or core network nodes or external nodes) with one or more of D2D related capabilities, where the list comprises, e.g., identifications associated with the other network nodes.

The wireless device(s) 20 within coverage of the broadcast transmission may, upon a need, detect and decode the broadcast transmission including the network node D2D capability and may further use it for one or more operational tasks, e.g., such as the operational tasks described with respect to the wireless device(s) 20 above. In one example, the D2D related capability(-ies) may be included in the broadcasted SI of the network node.

Some examples of the first network node are a radio network node (e.g., a radio base station, an access point, a cluster head, etc.), a core network node, a SON node, an O&M node, a positioning node, a server, an application server, a D2D server (which may be capable of some but not all D2D related features), an external node, or a node comprised in another network. Further, the signaling may be via logical or physical links and may comprise higher layer signaling or physical layer signaling. Also, a request for the D2D related capability in some embodiments may be received from the wireless device 20 or from another node. The D2D related capability information may be provided in response to this request.

Figure 12:
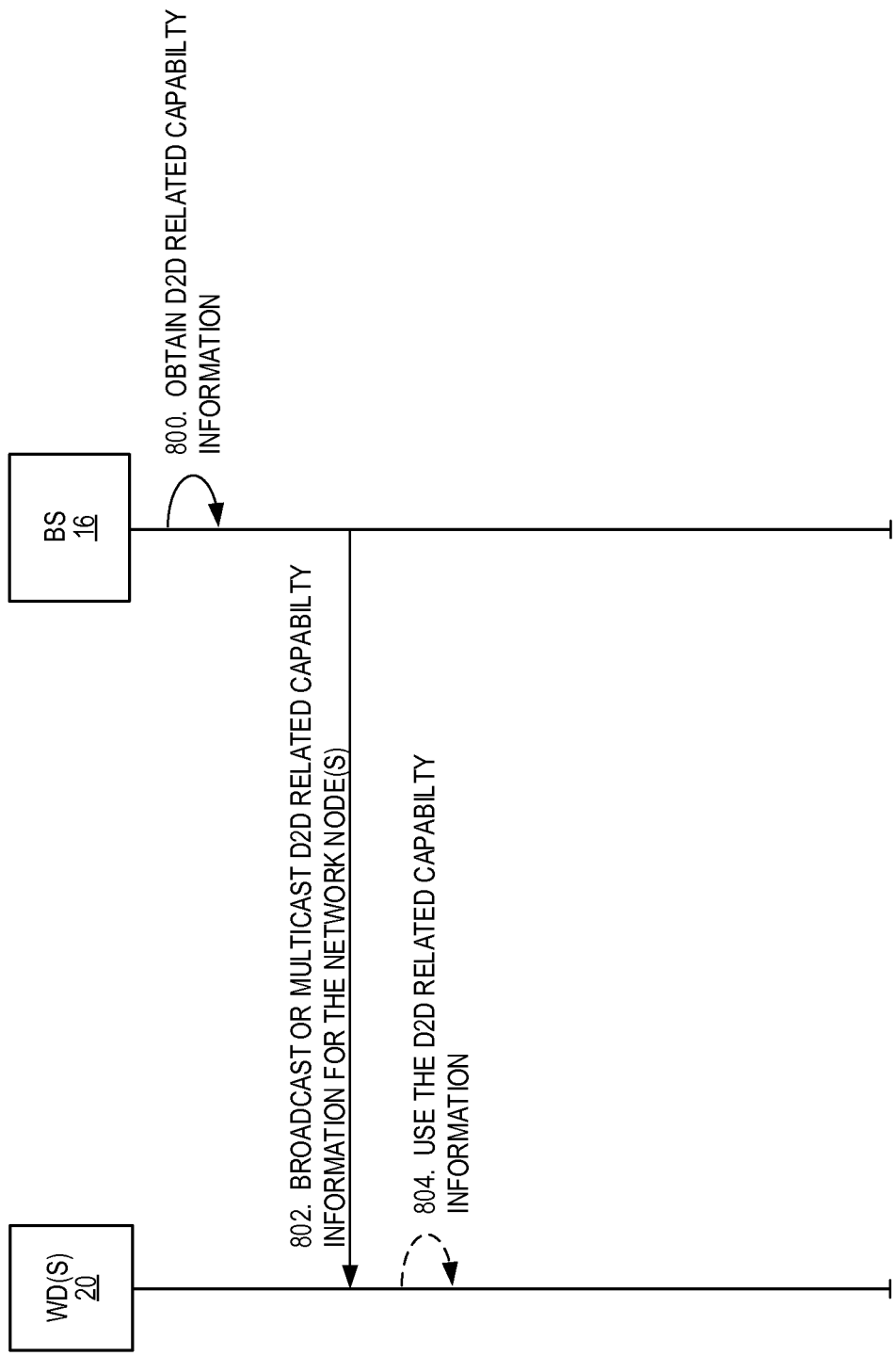
FIG. 12 illustrates the operation of a network node to obtain and provide D2D related capability information for itself and/or one or more other network nodes according to some other embodiments of the present disclosure.

In this regard, FIG. 12 illustrates the operation of a network node 28 to obtain and broadcast/multicast D2D related capability information for itself and/or one or more other network nodes according to some embodiments of the present disclosure. In this example, the network node 28 is the base station 16, but the network node 28 may be any radio network node. As illustrated, the base station 16 obtains its own D2D related capability information and/or the D2D related information for the other network node(s) (step 800). The base station 16 may obtain its own D2D related capability information from, e.g., internal storage of the base station 16 or external storage accessible to the base station 16, but is not limited thereto. The base station 16 may obtain the D2D related capability information of the other network node(s) in any suitable manner. For example, the base station 16 may request D2D related capability information from the other network node(s), receive the D2D related capability information from the other network node(s) via signaling (e.g., higher layer signaling, physical layer signaling, broadcast, multicast, or dedicated signaling), determine the D2D related capability information for the other network node(s) by performing measurement(s) on known signals (e.g., determining whether known signal(s) indicative of one or more predefined D2D related capabilities are transmitted by other radio network nodes), determining the D2D related capability information based on one or more predefined rules, obtaining the D2D related capability information of the other network node(s) from wireless device(s) 20 that themselves have obtained the D2D related capability information from the other network node(s), etc.

The base station 16 then broadcasts or multicasts the D2D related capability information for itself and/or the other network node(s) to the wireless device(s) 20, as discussed above (step 802). As discussed above, the D2D related capability information may be provided to the wireless device(s) 20 by broadcasting/multicasting the actual D2D related capability information or by broadcasting/multicasting an indication of the actual D2D related capability information. While not necessary for this embodiment, the wireless device(s) 20 may then use the D2D related capability information as described above (step 804).

Figure 13:
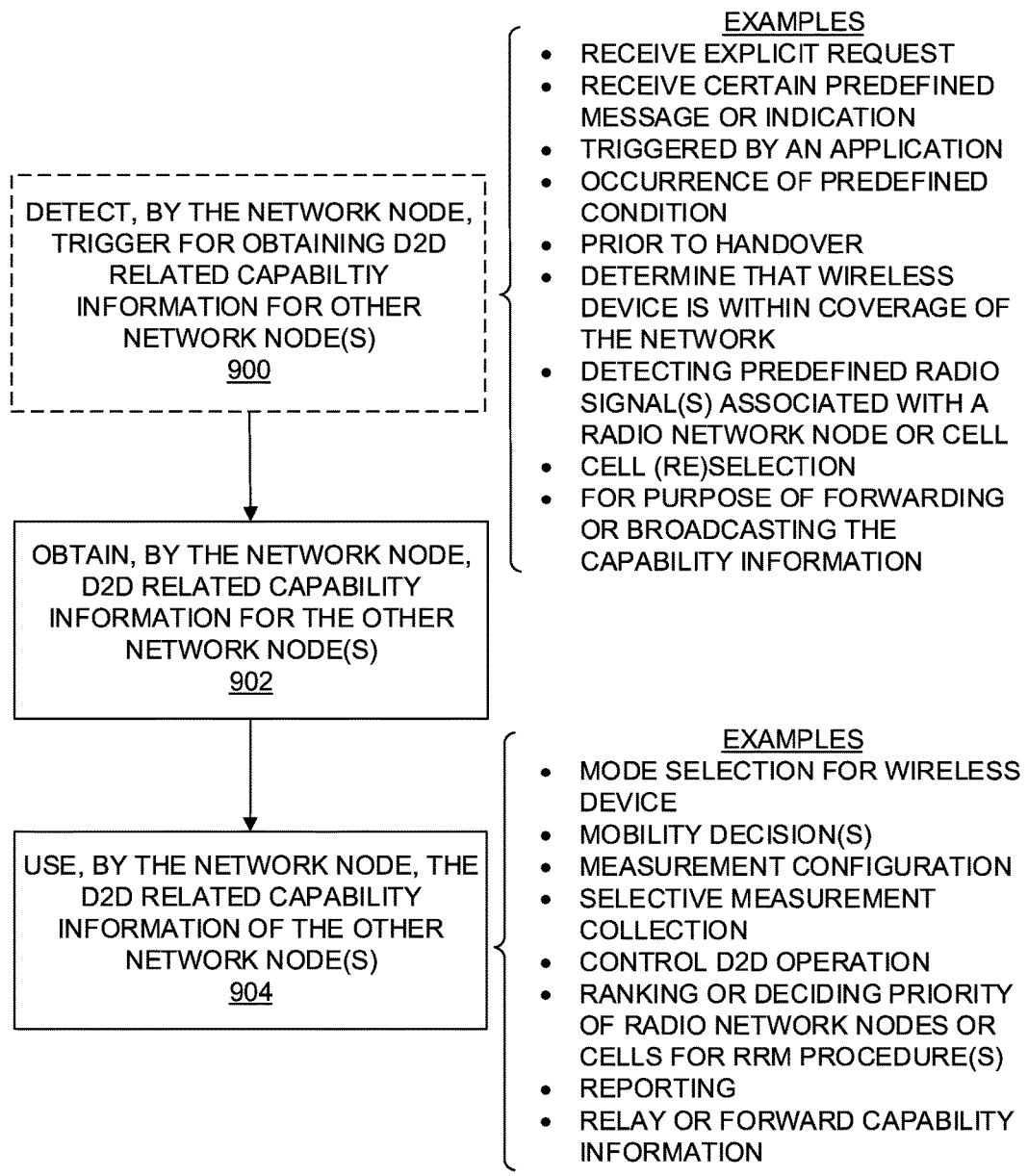
FIG. 13 is a flow chart that illustrates the operation of a network node to obtain and use D2D related capability information for one or more other network nodes according to some embodiments of the present disclosure.

FIG. 13 is a flow chart that illustrates the operation of a network node to obtain and use D2D related capability information for another network node(s) according to some embodiments of the present disclosure. As discussed above, the network node as well as the other network node(s) for which the D2D related capability information is obtained may be radio network nodes and/or network nodes other than radio network nodes. Some examples of a radio network node are a radio base station (e.g., the base station 16), a relay node, an access point, a cluster head, etc. The radio network node is comprised in a wireless communications network (e.g., the cellular communications system 10) and may also support cellular operation. Some examples of a network node which is not a radio network node include a core network node, a SON node, an O&M node, a positioning node, a server, an application server, a D2D server (which may be capable of some but not all D2D related features), a ProSe application server, an external node, or a node comprised in another network.

As illustrated in FIG. 13, in some embodiments (i.e., optionally), the network node detects a trigger for obtaining (i.e., starting obtaining) D2D related capability information for one or more other network nodes (step 900). While any suitable trigger may be used, in some embodiments, the network node may start obtaining D2D related capability information for a network node (e.g., a radio network node) in response to, for example, any one or more of the following:
 upon receiving an explicit request for such capability from another network node or a wireless device 20;
 upon receiving a certain predefined message or an indication from another node (e.g., from another network node or from a wireless device 20);
 upon triggering by an application;
 upon a certain condition (e.g., a quality of cellular operation is below a threshold for one or more users);

for embodiments where the network node is a radio network node (e.g., the base station 16):

prior to handover of a wireless device 20 to the radio network node;

upon determining that a wireless device 20 is within coverage of a radio communications network (e.g., the RAN 12) comprising the radio network node (e.g., upon receiving from the wireless device 20 a measurement associated with the radio network node); and upon detecting one or more predefined radio signals (e.g., PSS/SSS, Customized Ringing Signal (CRS), Positioning Reference Signal (PRS), etc.) associated with the radio network node;

for the purpose of cell selection or cell reselection for one or more wireless devices 20; and for the purpose of forwarding the capability information to another node (e.g., another network node or a wireless device 20) or broadcasting/multicasting the capability information.

The network node then obtains the D2D related capability information for the one or more other network nodes (step 902). The manner in which the network node obtains the D2D related capability information may vary. Further, while examples are given below, the D2D related capability information may be obtained using any suitable technique. In particular, the network node may obtain the D2D related capability information for the other network node(s) in one or more ways such as, for example, signaling from the network node(s), signaling from a network node other than the network node(s) for which the D2D related capability information is obtained, signaling from a wireless device 20 (e.g., the wireless device 20 is forwarding the D2D capability information or an indication thereof for the other network node(s) to the network node), reading data stored or preconfigured in the network node, reading data from an external database or media, determining the D2D related capability information for the other network node(s) based on measurement(s), and/or determining the D2D related capability information for the other network node(s) based on a predefined rule(s).

More specifically, with respect to signaling (e.g., higher layer or physical layer signaling), the network node may obtain the D2D related capability information for the other network node(s) via signaling from that network node(s) itself (themselves), from another network node, or from a wireless device(s) 20. The D2D related capability information may be explicitly indicated or comprised implicitly, e.g., via broadcast, multicast, or dedicated signaling. The node from which the network node receives such signaling is referred to herein as a signaling node. The signaling node may signal its own D2D related capability information and/or the D2D related capability information for another network node(s), e.g., typically adjacent or nearby nodes. In one example, the signaling node may provide to the network node a list of radio network nodes in its neighborhood that have one or more D2D capabilities, where the list may comprise identities associated with the radio network nodes or cells. In another example, the signaling node may provide to the network node a list of radio network nodes in its neighborhood that do not have a certain D2D capability, where the list may comprise identities associated with the radio network nodes or cells. In yet another example, the D2D related capability information or an indication thereof may be comprised in node-specific, cell-specific, or system-specific information (e.g., SI) signaled (e.g., broadcasted via a physical broadcast channel) by the radio network node.

Further, the higher layer signaling may be, for example, broadcast, multicast, or dedicated signaling. Example methods in a network node for providing the network node's own or another node's D2D related capability are also described below.

With regard to obtaining the D2D related capability information by reading data stored or preconfigured in local or external storage, the network node may obtain the D2D related capability information by reading corresponding data stored or preconfigured in the network node (e.g., from an internal database, subscription configuration, etc.) or by reading corresponding data from an external database or media.

With regard to determining the D2D related capability information based on measurements, the network node may obtain the D2D related capability information by performing measurement(s) on known signal(s) and then determine the D2D related capability information based on the measurement(s). For example, if the other network node(s) include a radio network node and a known radio signal associated with D2D operation is transmitted by the radio network node, it may be assumed that the radio network node has one or more of the D2D related capabilities. As another example, the network node may perform the measurements with respect to searching for synchronization signals indicative of D2D related capability (e.g., extended synchronization sequences such as PSS and/or SSS sequences used for D2D operations in the downlink or uplink spectrum). If such signals are detected, then it may be assumed that the transmitting radio network node has one or more D2D related capabilities. In an explicit example, SSS subsequence combinations currently not allocated may be used for signaling certain network node D2D capability. Hence, in this case, the network node may not only determine the cell group but also actual D2D capability for that particular radio network node. In one embodiment, the extended SSSs are transmitted in certain subframes (i.e., as extensions to legacy PSS/SSS).

Lastly, with regard to determining the D2D related capability information for the other network node(s) based on a predefined rule(s), in one example, the network node determines the D2D related capability information for a radio network node by applying a predefined rule to an identity associated with the radio network node when it is predefined that a certain set of identities is associated with/reserved for radio network nodes having D2D related capability.

Once the D2D related information for the other network node(s) is obtained by the network node, the network node uses the D2D related information (step 904). In particular, the network node uses the D2D related information obtained for the other network node(s) to perform one or more tasks. In general, the one or more tasks may include one or more operational tasks, one or more RRM related tasks, one or more mobility related tasks, one or more MDT related tasks, one or more SON related tasks, one or more positioning related tasks, etc. For example, the task(s) performed by the wireless device 20 based on the D2D related capability information include one or more of the following:

selecting between at least any two of the following modes of operation for a wireless device(s) 20: (a) a cellular operation mode (i.e., a normal non-D2D mode of operation), (b) a D2D operation mode, or (c) a specific D2D operation mode, e.g.:

in a cell associated with a radio network node which has no or a limited D2D capability, a wireless device 20 may not operate in D2D operation mode with the radio network involvement; or a wireless device 20 may operate in D2D operation which does not involve radio network nodes (e.g., not network-assisted but UE-based D2D operation);

making a decision related to mobility for one or more wireless devices 20, PLMN selection, RAT selection, cell selection, cell reselection, or handover (e.g., do not (re)select or avoid letting a wireless device 20 camp on a cell without D2D capability); and if the other network node(s) for which the D2D related information obtained by the wireless device 20 includes a radio network node:

setting or selecting a measurement configuration (e.g., initiating a D2D related measurement on radio signals transmitted by the radio network node having D2D related capability and not configuring similar measurements for radio network nodes without the necessary or desired D2D capability);

selectively collecting measurements from wireless devices 20 that are within coverage of the radio network nodes with the D2D capability (e.g., a predefined D2D capability(-ies)), e.g., for RRM, SON, positioning, etc.;

controlling D2D operation (e.g., turn on/off) of the radio network nodes with the D2D capability (e.g., a predefined D2D capability(-ies)), e.g., to coordinate interference or to balance traffic between downlink and uplink resources and/or cellular and D2D modes;

ranking or deciding priorities of the radio network nodes or cells for one or more RRM procedures (e.g., for handover, for performing RRM measurements, for measurement ranking prior reporting, etc.);

reporting to another node that the radio network node has a D2D related capability (e.g., reporting an identity associated with the radio network node upon a request from another node or in an unsolicited way); and relaying or forwarding all or at least a part of the radio network node's capability information to another node (e.g., another base station 16 or another wireless device 20).

Figure 14:
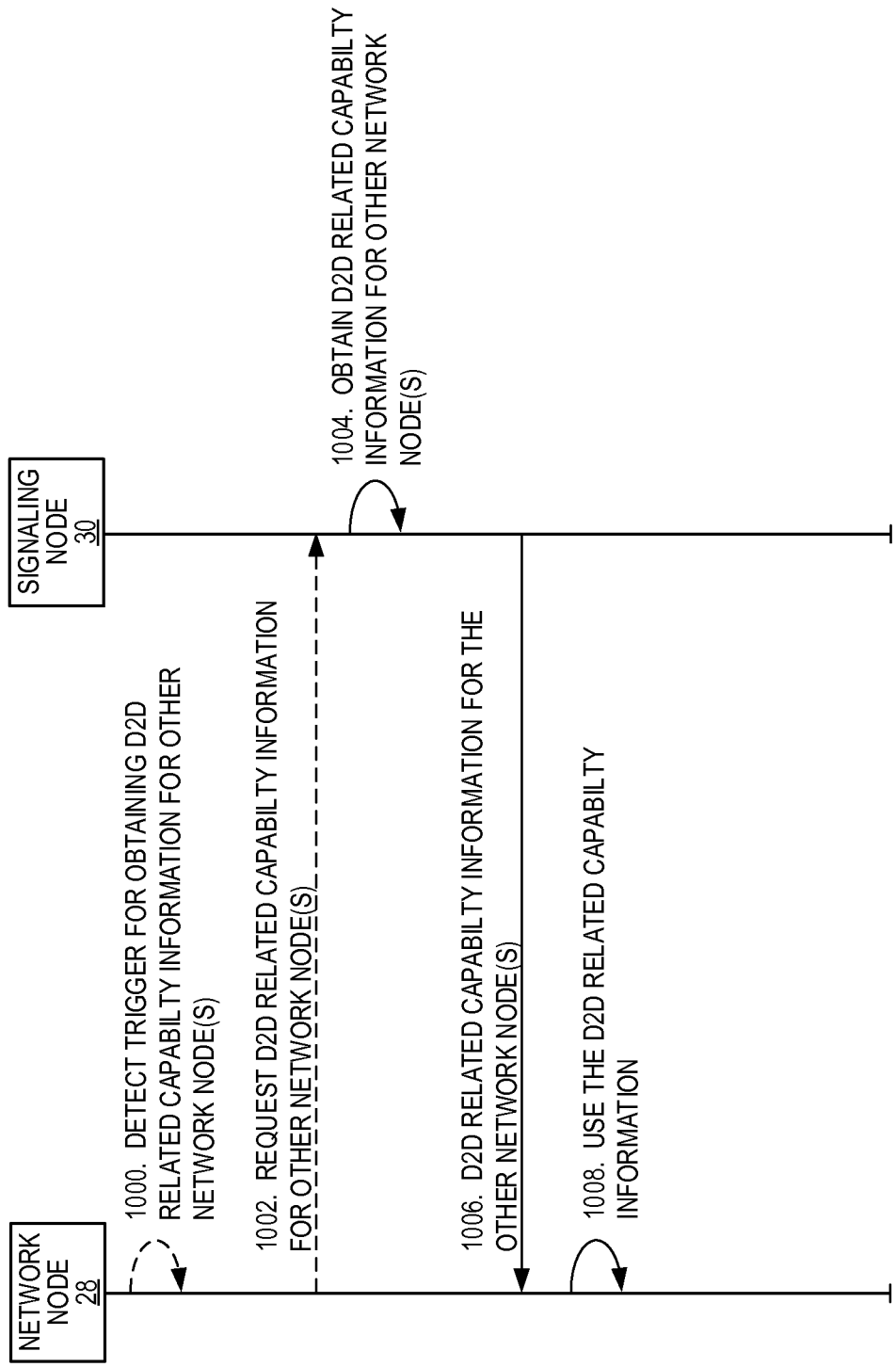
FIG. 14 illustrates an embodiment in which a network node obtains D2D related capability information for one or more other network nodes via signaling.

FIGS. 14 through 18 illustrate examples of the methods of obtaining the D2D related capability information for the network node according to some embodiments of the present disclosure. More specifically, FIG. 14 illustrates an embodiment in which a network node 28 obtains D2D related capability information for one or more other network nodes via signaling (e.g., higher layer signaling or physical layer signaling), as discussed above. As illustrated, the network node 28 may, in some embodiments, detect a trigger for obtaining the D2D related capability information, as described above with respect to step 900 of FIG. 13 (step 1000). In some embodiments, after detecting the trigger (e.g., in response to detecting the trigger), the network node 28 sends a request to a signaling node 30 for D2D related capability information (step 1002). Again, this request is optional and is not required in all embodiments.

The signaling node 30 may be, for example, a radio access node (e.g., the base station 16). The signaling node 30 obtains D2D related capability information for one or more other network nodes (step 1004). The other network node(s) include the signaling node 30 and/or network nodes other than the network node 28. The signaling node 30 may obtain the D2D related capability information using any suitable technique (e.g., signaling, reading data from internal or external storage, based on measurement(s) (e.g., detection of) known signal(s), predefined rule(s), or the like). The signaling node 30 signals the D2D related capability information for the other network node(s) to the network node 28, as described above (step 1006). The network node 28 then uses the D2D related capability information as described above with respect to step 904 of FIG. 13 (step 1008).

Figure 15:
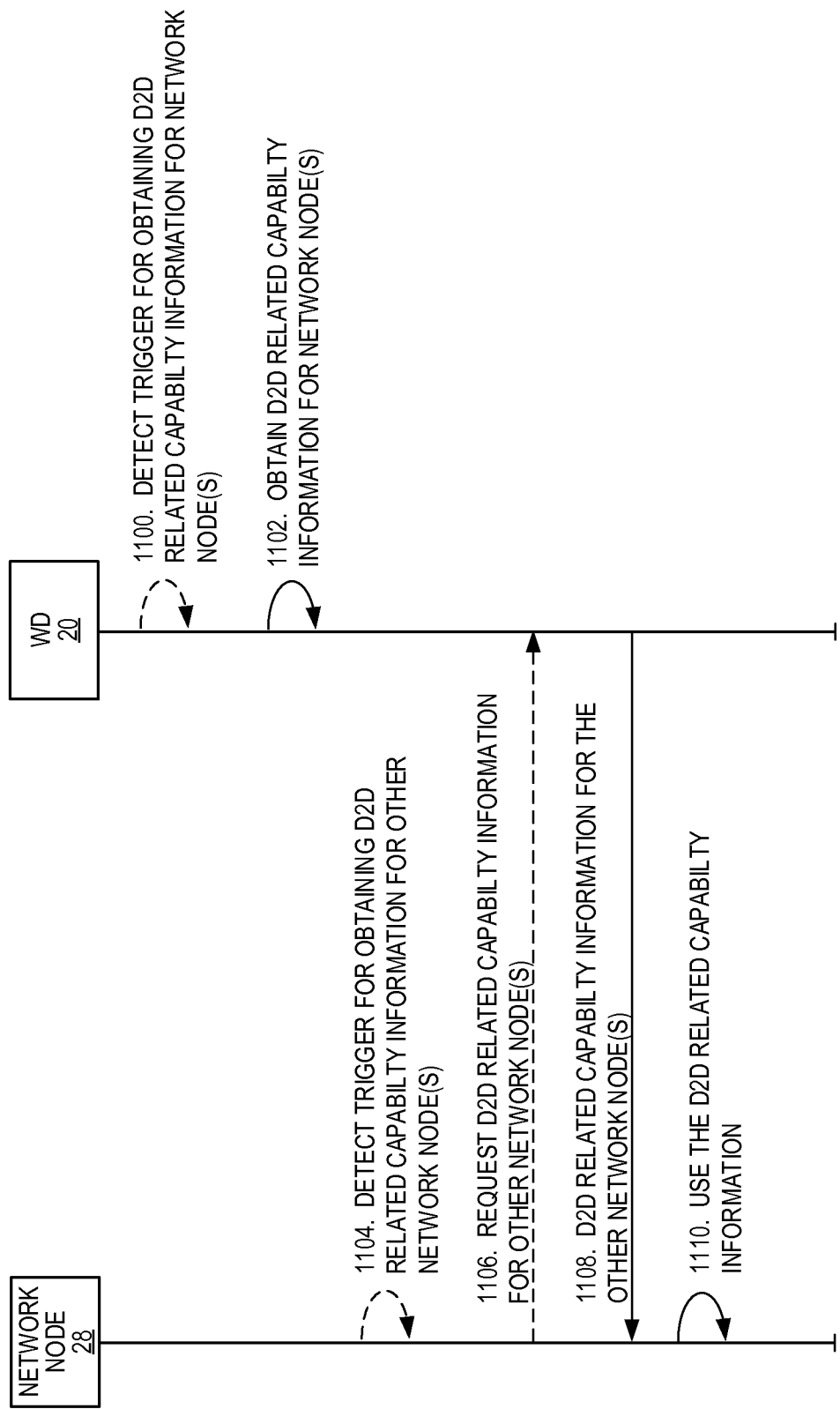
FIG. 15 illustrates an embodiment in which a network node obtains D2D related capability information for one or more other network nodes from a wireless device.

FIG. 15 illustrates an embodiment in which a network node 28 obtains D2D related capability information for one or more other network nodes from a wireless device 20, as discussed above. As discussed above, in some embodiments, the wireless device 20 detects a trigger for obtaining D2D related capability information for one or more network nodes (step 1100). Potentially in response to detecting this trigger (but alternatively without a triggering event), the wireless device 20 obtains D2D related capability information for one or more network nodes according to, e.g., any of the embodiments described above (step 1102).

As illustrated, the network node 28 may, in some embodiments, detect a trigger for obtaining the D2D related capability information, as described above with respect to step 900 of FIG. 13 (step 1104). In some embodiments, after detecting the trigger (e.g., in response to detecting the trigger), the network node 28 sends a request to the wireless device 20 for D2D related capability information (step 1106). Again, this request is optional and is not required in all embodiments. The wireless device 20 provides the D2D related capability information for the other network node(s) to the network node 28, as described above (step 1108). The network node 28 then uses the D2D related capability information as described above with respect to step 904 of FIG. 13 (step 1110).

Figure 16:
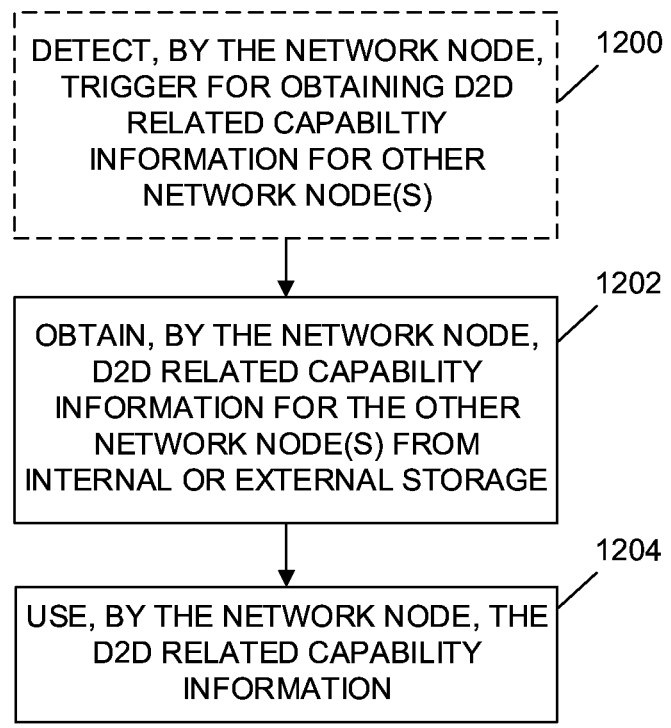
FIG. 16 illustrates an embodiment in which a network node obtains D2D related capability information for one or more other network nodes by reading corresponding data from internal or external storage.

FIG. 16 illustrates an embodiment in which the network node 28 obtains the D2D related capability information for the other network node(s) by reading corresponding data from internal or external storage, as described above. As illustrated, the network node 28 may, in some embodiments, detect a trigger for obtaining the D2D related capability information, as described above with respect to step 900 of FIG. 13 (step 1200). The network node 28 then obtains D2D related capability information for one or more other network nodes from internal or external storage (step 1202). More specifically, in some embodiments, the network node 28 reads data corresponding to or indicative of the D2D related capability of one or more other network nodes from internal or external storage. The data may be read from, for example, an internal database of the network node 28, a subscription configuration of the network node 28, or the like. Alternatively, the data may be read from an external database or media that is accessible to the network node 28. The network node 28 then uses the D2D related capability information as described above with respect to step 904 of FIG. 13 (step 1204).

Figure 17:
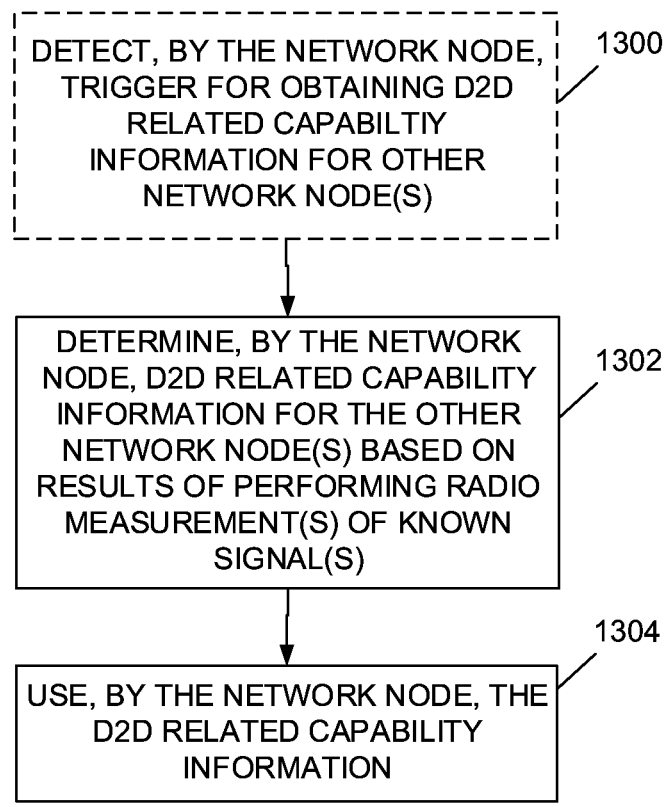
FIG. 17 illustrates an embodiment in which a network node obtains D2D related capability information for one or more other network nodes by determining the D2D related capability information based on measurement(s) of known signal(s)

FIG. 17 illustrates an embodiment in which the network node 28 obtains the D2D related capability information for the other network node(s) by determining the D2D related capability information based on measurement(s) of known signal(s) as discussed above. As illustrated, the network node 28 may, in some embodiments, detect a trigger for obtaining the D2D related capability information, as described above with respect to step 900 of FIG. 13 (step 1300). In some embodiments, after detecting the trigger (e.g., in response to detecting the trigger), the network node 28 performs measurements on one or more known signals.

Based on the measurement(s) performed by the network node 28, the network node 28 determines the D2D related capability information for one or more other network nodes (e.g., the base station 16) (step 1302). In some embodiments, the network node 28 performs the measurement(s) to determine whether a particular known radio signal associated with D2D operation is transmitted by the other network node(s). If so, the network node 28 determines that the other network node(s) has one or more predefined (e.g., preconfigured) D2D related capabilities. In other embodiments, the network node 28 uses the measurement(s) to search for synchronization signals indicative of D2D related capability (e.g., extended synchronization sequences such as PSS and/or SSS sequences used for D2D operations in the downlink or uplink spectrum), as discussed above. Once the network node 28 has determined the D2D related capability information, the network node 28 uses the D2D related capability information as described above with respect to step 904 of FIG. 13 (step 1304).

Figure 18:
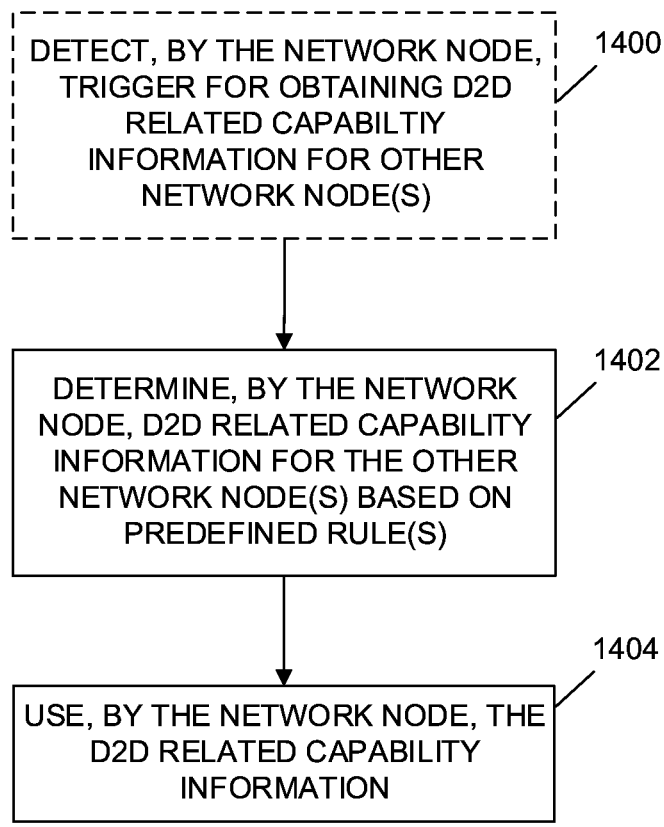
FIG. 18 illustrates an embodiment in which a network node obtains D2D related capability information for one or more other network nodes by determining the D2D related capability information based on one or more predefined rules.

FIG. 18 illustrates an embodiment in which the network node 28 obtains the D2D related capability information for the network node(s) by determining the D2D related capability information based on one or more predefined rules, as described above. As illustrated, the network node 28 may, in some embodiments, detect a trigger for obtaining the D2D related capability information, as described above with respect to step 900 of FIG. 13 (step 1400). The network node 28 then determines D2D related capability information for one or more other network node(s) based on one or more predefined rules (step 1402). The predefined rule(s) may be any predefined rule(s) that enable the network node 28 to determine the D2D related capability information for the other network node(s) based on information that is available to the network node 28. For example, the network node 28 may determine the D2D related capability information of a radio network node (e.g., the base station 16) based on an identify of the radio network node (or an identity of a cell served by the radio network node) and a predefined rule that states that a predefined set of identities are associated with or reserved for radio network nodes having one or more predefined D2D related capabilities. Further, different sets of identities may be predefined for different D2D related capabilities or different sets of D2D related capabilities. The network node 28 then uses the D2D related capability information as described above with respect to step 904 of FIG. 13 (step 1404).

Although the described solutions may be implemented in any appropriate type of telecommunications system supporting any suitable communication standards and using any suitable components, particular embodiments of the described solutions may be implemented in an LTE network. The example network may include one or more instances of wireless devices 20, which may also be referred to as wireless communication devices, (e.g., conventional UEs, communication (Machine-Type Communications (MTC))/Machine-to-Machine (M2M) UEs) and one or more radio access nodes (e.g., eNBs or other base stations 16) capable of communicating with these wireless devices 20 along with any additional elements suitable to support communication between wireless devices 20 or between a wireless device 20 and another communication device (such as a landline telephone). In addition, at least some of the wireless devices 20 and the radio access nodes have D2D capabilities. Further, in some embodiments, network nodes (e.g., some or all of the radio access nodes) provide D2D related capability information to other network nodes and/or wireless communication devices, as discussed above. In addition or alternatively, the network nodes obtain D2D related capability information of another network node and use the D2D related capability information for one or more tasks, as discussed above. Still further, in some embodiments, wireless devices 20 obtain D2D related capability information of a network node and use the obtained information for one or more tasks, as discussed above.

Figure 19:
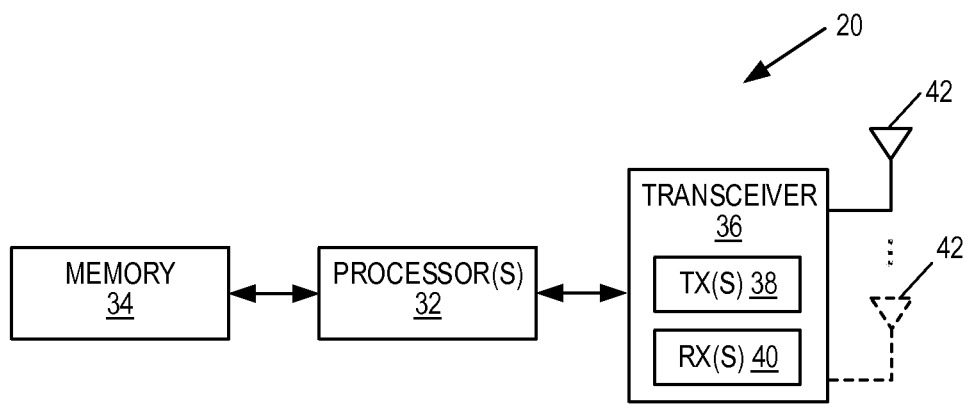
FIG. 19 is a block diagram of a wireless device according to some embodiments of the present disclosure.
Figure 20:
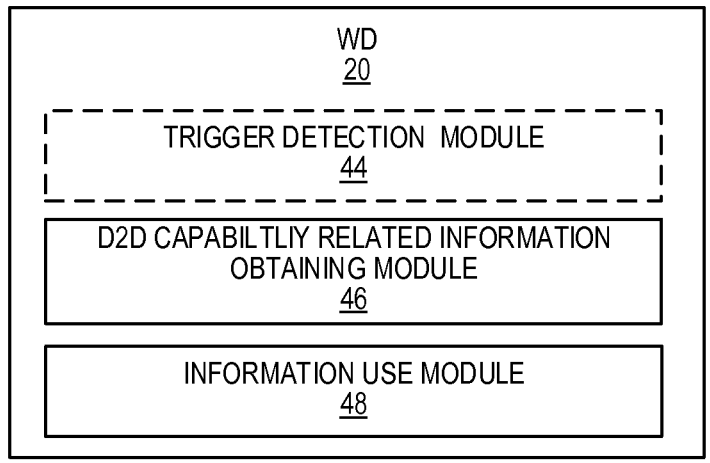
FIG. 20 is a block diagram of a wireless device according to some other embodiments of the present disclosure.

Although the illustrated wireless devices 20 may represent communication devices that include any suitable combination of hardware and/or software, these wireless devices 20 may, in particular embodiments, represent devices such as the example wireless device 20 illustrated in greater detail by FIGS. 19 and 20. Similarly, although a network node may represent network nodes that include any suitable combination of hardware and/or software, these nodes may, in particular embodiments, represent devices such as the example network node 28 illustrated in greater detail by FIGS. 21 and 22.

FIG. 19 is a block diagram of the wireless device 20 according to some embodiments of the present disclosure. As illustrated, the wireless device 20 includes one or more processors 32 (e.g., Central Processing Unit(s) (CPU(s)), Application Specific Integrated Circuit(s) (ASIC(s)), Field Programmable Gate Array(s) (FPGA(s))), memory 34, and a transceiver 36 including one or more transmitters 38 and one or more receivers 40 coupled to one or more antennas 42. In some embodiments, the functionality of the wireless device 20 described herein is implemented in software stored in the memory 34, where the software is executed by the processor(s) 32 such that the wireless device 20 operates according to any of the embodiments described herein. Alternative embodiments of the wireless device 20 may include additional components beyond those shown in FIG. 19 that may be responsible for providing certain aspects of the wireless device's 20 functionality, including any of the functionality described above and/or any functionality necessary to support the solution described above.

In some embodiments, a computer program including instructions which, when executed by at least one processor, causes the at least one processor to carry out the functionality of the wireless device 20 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 34).

FIG. 20 is a block diagram of the wireless device 20 according to some other embodiments of the present disclosure. As illustrated, the wireless device 20 includes a trigger detection module 44 (in some embodiments), a D2D capability related information obtaining module 46, and an information use module 48, each of which is implemented in software. In some embodiments, the trigger detection module 44 is used to detect a trigger for obtaining D2D related capability information for one or more network nodes, as described above. The D2D capability related information obtaining module 46 operates to obtain D2D related capability information for one or more network nodes, as described above. Lastly, the information use module 48 operates to use the obtained D2D related capability information to perform one or more tasks, as described above.

Figure 21:
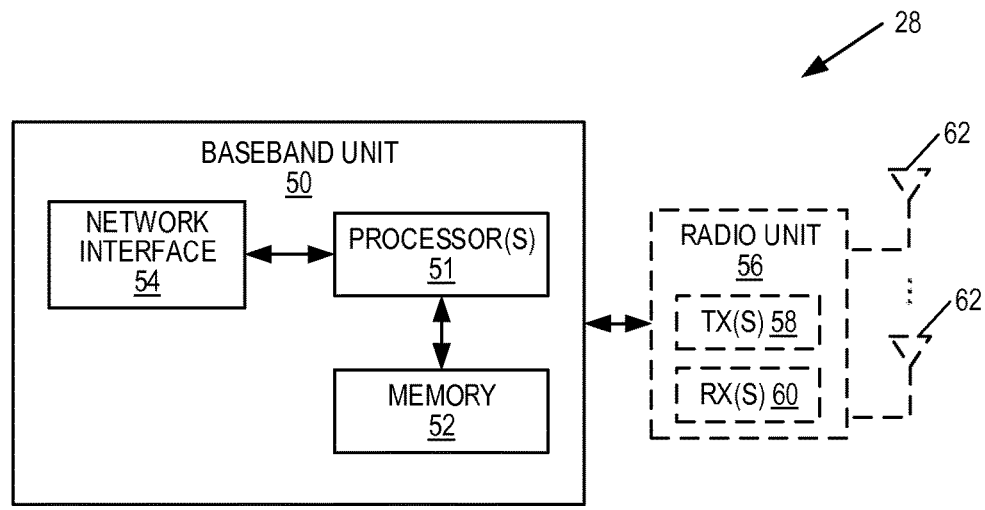
FIG. 21 is a block diagram of a network node according to some embodiments of the present disclosure.

FIG. 21 is a block diagram of a network node 28 according to some embodiments of the present disclosure. Note that this discussion is equally applicable to the signaling nodes 27 and 30. The network node 28 may be, e.g., a core network node or a radio network node. As illustrated, the network node 28 includes a baseband unit 50 including one or more processors 51 (e.g., CPU(s), ASIC(s), and/or FPGA(s)), memory 52, and a network interface 54. If the network node 28 is a radio network node (e.g., the base station 16), the network node 28 also includes a radio unit 56 including one or more transmitters 58 and one or more receivers 60 coupled to one or more antennas 62. In some embodiments, the functionality of the network node 28 is implemented in software and stored in the memory 52 for execution by the processor(s) 51. Alternative embodiments of the network node 28 may include additional components responsible for providing additional functionality, including any of the functionality identified above and/or any functionality necessary to support the solution described above.

In some embodiments, a computer program including instructions which, when executed by at least one processor, causes the at least one processor to carry out the functionality of the network node 28 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 52).

Figure 22:
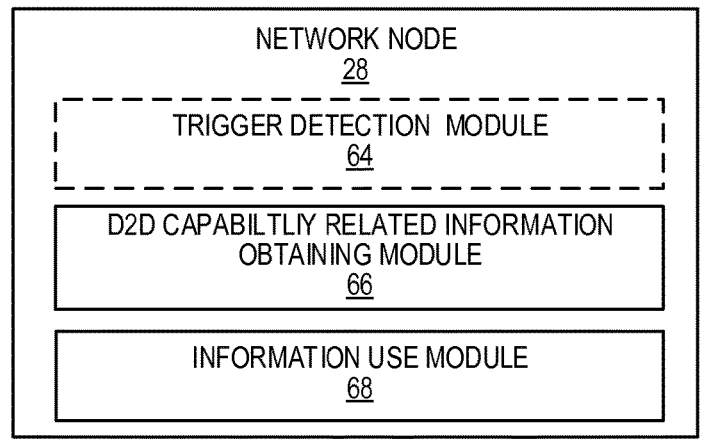
FIG. 22 is a block diagram of a network node according to some other embodiments of the present disclosure.

FIG. 22 is a block diagram of the network node 28 according to some other embodiments of the present disclosure. As illustrated, the network node 28 includes a trigger detection module 64 (in some embodiments), a D2D capability related information obtaining module 66, and an information use module 68, each of which is implemented in software. In some embodiments, the trigger detection module 64 is used to detect a trigger for obtaining D2D related capability information for one or more network nodes, as described above. The D2D capability related information obtaining module 66 operates to obtain D2D related capability information for one or more network nodes, as described above. Lastly, the information use module 68 operates to use the obtained D2D related capability information to perform one or more tasks (e.g., providing the D2D capability information to other network nodes and/or wireless devices 20), as described above.

Systems and methods are disclosed herein for providing, obtaining, and/or using D2D related capability information of a network node (e.g., a radio network node) in a cellular communications network. In one embodiment, a method of operation of a wireless device includes obtaining D2D related capability information of a network node (e.g., radio network node) and using the obtained D2D related capability information for one or more tasks (e.g., one or more operational tasks). In one embodiment, the network node for which the D2D related capability information is obtained is a radio network node (e.g., a base station) of the cellular communications network.

In one embodiment, a wireless device includes a transceiver and a processor, where the processor is configured to obtain D2D related capability information of a network node (e.g., a radio network node) and use the obtained D2D related capability information for one or more tasks (e.g., one or more operational tasks). In one embodiment, the network node for which the D2D related capability information is obtained is a radio network node (e.g., a base station) of the cellular communications network.

In one embodiment, a method of operation of a network node comprises providing D2D related capability information for the network node to one or more wireless devices and/or one or more other network nodes.

In one embodiment, a network node includes a processor configured to provide D2D related capability of the network node to one or more wireless devices and/or one or more other network nodes.

In yet another embodiment, a method of operation of a network node includes obtaining D2D related capability information of a network node (e.g., a radio network node) and using the obtained D2D related capability information for one or more tasks (e.g., one or more operational tasks). In one embodiment, the network node for which the D2D related capability information is obtained is a radio network node (e.g., a base station) of the cellular communications network.

In another embodiment, a network node includes a processor configured to obtain D2D related capability information of a network node (e.g., a radio network node) and use the obtained D2D related capability information for one or more tasks (e.g., one or more operational tasks). In one embodiment, the network node for which the D2D related capability information is obtained is a radio network node (e.g., a base station) of the cellular communications network.

In particular, the following example embodiments are described herein. In one embodiment, a method of a wireless device is disclosed, wherein the method comprises the steps of:
    obtaining a D2D related capability of a radio network node (e.g., of a base station); and
    using the obtained information for one or more operational tasks.

In another embodiment, a method of a network node for providing its D2D related capability to one or more wireless devices or another network node is disclosed.

In one embodiment, a method of a network node comprises the steps of:
    obtaining a D2D related capability of a radio network node (e.g., of a base station); and
    using the obtained information for one or more operational tasks.

The following acronyms are used throughout this disclosure.
    3GPP 3$^{rd}$ Generation Partnership Project
    APP Application
    ASIC Application Specific Integrated Circuit
    CDMA Code Division Multiple Access
    CPU Central Processing Unit
    CRS Customized Ringing Signal
    D2D Device-to-Device
    eNB Evolved or Enhanced Node B
    EPC Evolved or Enhanced Packet Core
    E-UTRAN Evolved or Enhanced Universal Terrestrial Radio Access Network
    FDD Frequency Division Duplexing
    FPGA Field Programmable Gate Array
    GSM Global System for Mobile Communications
    LTE Long Term Evolution
    M2M Machine-to-Machine
    MDT Minimization of Drive Tests
    MTC Machine-Type Communications
    O&M Operations and Management
    P2P Peer-to-Peer
    PDA Personal Digital Assistant
    PGW Packet or Packet Data Network Gateway
    PLMN Public Land Mobile Network
    ProSe Proximity Service
    PRS Positioning Reference Signal
    PSS Primary Synchronization Signal
    RAN Radio Access Network
    RAT Radio Access Technology
    RRC Radio Resource Control
    RRH Remote Radio Head
    RRM Radio Resource Management
    SI System Information SGW Serving Gateway
SON Self-Organizing Network
SSS Secondary Synchronization Signal
SUPL Secure User Plane Location
TDD Time Division Duplexing
UE User Equipment
UTRA Universal Terrestrial Radio Access
WCDMA Wideband Code Division Multiple Access
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A wireless device for operation in a cellular communications system, comprising:
    a transceiver comprising at least one transmitter and at least one receiver;
    at least one processor; and
    memory containing instructions executable by the at least one processor whereby the wireless device is operative to:
        obtain Device-to-Device (D2D) related capability information for one or more network nodes in the cellular communications system where the D2D related capability information comprises information indicative of resource configuration information of the one or more network nodes in regard to one or more D2D activities where each of the one or more network nodes is one of the group consisting of a radio network node and a core network node and where the resource configuration information comprises time and/or frequency resources that the wireless device is allowed to use for D2D communications; and
        use the D2D related capability information to perform one or more tasks where the one or more tasks comprise at least one of the group consisting of:
            making a decision related to mobility of the wireless device;
            ranking or deciding a priority of at least one of the one or more network nodes for one or more Radio Resource Management (RRM) procedures;
            ranking or deciding a priority of at least one cell served by at least one of the one or more network nodes for one or more RRM procedures;
            selecting one or more measurements for measurement logging;
            selecting one or more measurements for measurement reporting;
            reporting one or more D2D related capabilities of at least one of the one or more network nodes to another network node; and
            relaying at least some of the D2D related capability information for at least one of the one or more network nodes to another node.

2. The wireless device of claim 1 wherein, for each network node of the one or more network nodes, the D2D related capability information comprises at least one of a group consisting of:
    information indicative of an ability of the network node in regard to one or more D2D activities on a certain carrier frequency;
    information indicative of an ability of the network node in regard to one or more D2D activities in a certain frequency band;
    information indicative of an ability of the network node in regard to one or more D2D activities in one or more specific Radio Access Technologies, RATs; and
    information indicative of an ability of the network node in regard to one or more D2D activities in a certain bandwidth.

3. The wireless device of claim 1 wherein, for each network node of the one or more network nodes, the D2D related capability information comprises at least one of a group consisting of:
    information indicative of an ability of the network node in regard to one or more D2D activities of a certain type;
    information indicative of an ability of the network node in regard to one or more D2D activities for a certain purpose;
    information indicative of an ability of the network node in regard to one or more D2D activities for a certain application; and
    information indicative of an ability of the network node in regard to one or more D2D activities for a certain service type.

4. The wireless device of claim 1 wherein, for each network node of the one or more network nodes, the D2D related capability information comprises at least one of a group consisting of:
    information indicative of an ability of the network node in regard to one or more D2D activities for a certain type of wireless device; and
    information indicative of an ability of the network node in regard to one or more D2D activities for wireless devices having one or more predefined characteristics.

5. The wireless device of claim 1 wherein, for each network node of the one or more network nodes, the D2D related capability information comprises information indicative of an ability of the network node to support a certain type of scheduling for D2D activities.

6. The wireless device of claim 1 wherein, for each network node of the one or more network nodes, the D2D related capability information comprises at least one of a group consisting of:
    information indicative of a number of D2D links that the network node is able to support;
    information indicative of a number of D2D connections that the network node is able to support; and
    information indicative of a number of D2D sessions that the network node is able to support.

7. The wireless device of claim 1 wherein, for each network node of the one or more network nodes, the D2D related capability information comprises at least one of a group consisting of:
    information indicative of an ability of the network node to obtain D2D related capability information of another network node; and
    information indicative of an ability of the network node to provide its own D2D related capability information.

8. The wireless device of claim 1 wherein the one or more network nodes comprise a radio access node.

9. The wireless device of claim 1 wherein, in order to obtain the D2D related capability information, the wireless device is further operative to, via execution of the instructions by the at least one processor:
    obtain the D2D related capability information via signaling received from a signaling node via the transceiver.

10. The wireless device of claim 9 wherein the signaling node is one of the one or more network nodes.

11. The wireless device of claim 9 wherein the signaling node is a network node in the cellular communications system other than the one or more network nodes.

12. The wireless device of claim 9 wherein the signaling one of a group consisting of: signaling at a protocol layer higher than a physical layer and signaling at the physical layer.

13. The wireless device of claim 1 wherein, in order to obtain the D2D related capability information, the wireless device is further operative to, via execution of the instructions by the at least one processor:
obtain the D2D related capability information for the one or more network nodes from internal storage of the wireless device or external storage accessible by the wireless device.

14. The wireless device of claim 1 wherein one of the one or more network nodes is a radio network node and, in order to obtain the D2D related capability information, the wireless device is further operative to, via execution of the instructions by the at least one processor:
perform one or more measurements on one or more known signals transmitted by the radio network node; and
determine the D2D related capability information for the radio network node based on the one or more measurements.

15. The wireless device of claim 1 wherein, in order to obtain the D2D related capability information, the wireless device is further operative to, via execution of the instructions by the at least one processor:
determine the D2D related capability information for the one or more network nodes based on one or more predefined rules.

16. The wireless device of claim 1 wherein in order to use the D2D related capability information to perform the one or more tasks, the wireless device is further operative to, via execution of the instructions by the at least one processor, select the one or more measurements for measurement reporting where the one or more measurements are only for network nodes with D2D related capability.

17. A method of operation of a wireless device for operation in a cellular communications system, comprising:
obtaining Device-to-Device (D2D) related capability information for one or more network nodes in the cellular communications system where the D2D related capability information comprises information indicative of resource configuration information of the one or more network nodes in regard to one or more D2D activities where each of the one or more network nodes is one of the group consisting of a radio network node and a core network node and where the resource configuration information comprises time and/or frequency resources that the wireless device is allowed to use for D2D communications; and
using the D2D related capability information to perform one or more tasks where the D2D related capability information comprises information indicative of resource configuration information of the network node in regard to one or more D2D activities; and
use the D2D related capability information to perform one or more tasks where the one or more tasks comprise at least one of the group consisting of:
making a decision related to mobility of the wireless device;
ranking or deciding a priority of at least one of the one or more network nodes for one or more Radio Resource Management (RRM) procedures;
ranking or deciding a priority of at least one cell served by at least one of the one or more network nodes for one or more RRM procedures;
selecting one or more measurements for measurement logging;
selecting one or more measurements for measurement reporting;
reporting one or more D2D related capabilities of at least one of the one or more network nodes to another network node; and
relaying at least some of the D2D related capability information for at least one of the one or more network nodes to another node.

18. A network node in a cellular communications system, comprising:
at least one communication interface;
at least one processor; and
memory containing instructions executable by the at least one processor whereby the network node is operative to:
obtain Device-to-Device (D2D) related capability information for one or more network nodes in the cellular communications system where the D2D related capability information comprises information indicative of resource configuration information of the one or more network nodes in regard to one or more D2D activities where each of the one or more network nodes is one of the group consisting of a radio network node and a core network node and where the resource configuration information comprises time and/or frequency resources that the wireless device is allowed to use for D2D communications; and
use the D2D related capability information to perform one or more tasks where the D2D related capability information comprises information indicative of resource configuration information of the one or more network nodes in regard to one or more D2D activities; and
use the D2D related capability information to perform one or more tasks where the one or more tasks comprise at least one of the group consisting of:
making a decision related to mobility of the wireless device;
ranking or deciding a priority of at least one of the one or more network nodes for one or more Radio Resource Management (RRM) procedures;
ranking or deciding a priority of at least one cell served by at least one of the one or more network nodes for one or more RRM procedures;
selecting one or more measurements for measurement logging;
selecting one or more measurements for measurement reporting;
reporting one or more D2D related capabilities of at least one of the one or more network nodes to another network node; and
relaying at least some of the D2D related capability information for at least one of the one or more network nodes to another node.

19. The network node of claim 18 wherein, for each network node of the one or more network nodes, the D2D related capability information comprises information indicative of an ability of the network node in regard to one or more D2D activities.

20. The network node of claim 18 wherein, for each network node of the one or more network nodes, the D2D related capability information comprises at least one of a group consisting of:
- information indicative of an ability of the network node in regard to one or more D2D activities on a certain carrier frequency;
- information indicative of an ability of the network node in regard to one or more D2D activities in a certain frequency band;
- information indicative of an ability of the network node in regard to one or more D2D activities in one or more specific Radio Access Technologies, RATs; and
- information indicative of an ability of the network node in regard to one or more D2D activities in a certain bandwidth.

21. The network node of claim 18 wherein, for each network node of the one or more network nodes, the D2D related capability information comprises at least one of a group consisting of:
- information indicative of an ability of the network node in regard to one or more D2D activities of a certain type;
- information indicative of an ability of the network node in regard to one or more D2D activities for a certain purpose;
- information indicative of an ability of the network node in regard to one or more D2D activities for a certain application; and
- information indicative of an ability of the network node in regard to one or more D2D activities for a certain service type.

22. The network node of claim 18 wherein, for each network node of the one or more network nodes, the D2D related capability information comprises at least one of a group consisting of:
- information indicative of an ability of the network node in regard to one or more D2D activities for a certain type of wireless device; and
- information indicative of an ability of the network node in regard to one or more D2D activities for wireless devices having one or more predefined characteristics.

23. The network node of claim 18 wherein, for each network node of the one or more network nodes, the D2D related capability information comprises information indicative of an ability of the network node to support a certain type of scheduling for D2D activities.

24. The network node of claim 18 wherein, for each network node of the one or more network nodes, the D2D related capability information comprises at least one of a group consisting of:
- information indicative of a number of D2D links that the network node is able to support;
- information indicative of a number of D2D connections that the network node is able to support; and
- information indicative of a number of D2D sessions that the network node is able to support.

25. The network node of claim 18 wherein, for each network node of the one or more network nodes, the D2D related capability information comprises at least one of a group consisting of:
- information indicative of an ability of the network node to obtain D2D related capability information of another network node; and
- information indicative of an ability of the network node to provide its own D2D related capability information.

26. The network node of claim 18 wherein the one or more network nodes comprise the network node.

27. The network node of claim 18 wherein the one or more network nodes comprise at least one network node other than the network node.

28. The network node of claim 18 wherein, in order to use the D2D related capability information, the network node is further operative to, via execution of the instructions by the at least one processor:
- signal the D2D related capability information to a wireless device.

29. The network node of claim 18 where the network node is a radio network node and, in order to use the D2D related capability information, the radio network node is further operative to, via execution of the instructions by the at least one processor:
- broadcast or multicast the D2D related capability information.

30. The network node of claim 18 wherein, in order to use the D2D related capability information, the network node is further operative to, via execution of the instructions by the at least one processor:
- signal the D2D related capability information to another network node.

31. The network node of claim 18 wherein, in order to obtain the D2D related capability information, the network node is further operative to, via execution of the instructions by the at least one processor:
- obtain the D2D related capability information via signaling received from another network node.

32. The network node of claim 18 wherein, in order to obtain the D2D related capability information, the network node is further operative to, via execution of the instructions by the at least one processor:
- receive the D2D related capability information from a wireless device.

33. The network node of claim 18 wherein, in order to obtain the D2D related capability information, the network node is further operative to, via execution of the instructions by the at least one processor:
- obtain the D2D related capability information for the one or more network nodes from internal storage of the network node or external storage accessible by the network node.

34. The network node of claim 18 wherein the one or more network nodes comprise a radio network node and, in order to obtain the D2D related capability information, the network node is further operative to, via execution of the instructions by the at least one processor:
- determine the D2D related capability information for the radio network node based on one or more measurements performed on one or more known signals transmitted by the radio network node.

35. The network node of claim 18 wherein in order to obtain the D2D related capability information, the network node is further operative to, via execution of the instructions by the at least one processor:
- determine the D2D related capability information for the one or more network nodes based on one or more predefined rules.

36. A method of operation of a network node in a cellular communications system, comprising:
- obtaining Device-to-Device (D2D) related capability information for one or more network nodes in the cellular communications system where the D2D related capability information comprises information indicative of resource configuration information of the one or more network nodes in regard to one or more D2D activities where each of the one or more network nodes is one of the group consisting of a radio network node and a core network node and where the resource configuration information comprises time and/or frequency resources that the wireless device is allowed to use for D2D communications; and using the D2D related capability information to perform one or tasks where the D2D related capability information comprises information indicative of resource configuration information of the one or more network nodes in regard to one or more D2D activities; and use the D2D related capability information to perform one or more tasks where the one or more tasks comprise at least one of the group consisting of:
- making a decision related to mobility of the wireless device;
- ranking or deciding a priority of at least one of the one or more network nodes for one or more Radio Resource Management, RRM, procedures;
- ranking or deciding a priority of at least one cell served by at least one of the one or more network nodes for one or more RRM procedures;
- selecting one or more measurements for measurement logging;
- selecting one or more measurements for measurement reporting;
- reporting one or more D2D related capabilities of at least one of the one or more network nodes to another network node; and
- relaying at least some of the D2D related capability information for at least one of the one or more network nodes to another node.

37. A wireless device for operation in a cellular communications system, comprising:
   a transceiver comprising at least one transmitter and at least one receiver;
   at least one processor; and
   memory containing instructions executable by the at least one processor whereby the wireless device is operative to:
      obtain Device-to-Device (D2D) related capability information for one or more network nodes in the cellular communications system where each of the one or more network nodes is one of the group consisting of a radio network node and a core network node and, for each network node of the one or more network nodes, the D2D related capability information comprises at least one of a group consisting of:
         information indicative of a number of D2D links that the network node is able to support;
         information indicative of a number of D2D connections that the network node is able to support; and
         information indicative of a number of D2D sessions that the network node is able to support; and
      use the D2D related capability information to perform one or more tasks.

38. A network node in a cellular communications system, comprising:
   at least one communication interface;
   at least one processor; and
   memory containing instructions executable by the at least one processor whereby the network node is operative to:
      obtain Device-to-Device (D2D) related capability information for one or more network nodes in the cellular communications system where each of the one or more network nodes is one of the group consisting of a radio network node and a core network node and, for each network node of the one or more network nodes, the D2D related capability information comprises at least one of a group consisting of:
         information indicative of a number of D2D links that the network node is able to support;
         information indicative of a number of D2D connections that the network node is able to support; and
         information indicative of a number of D2D sessions that the network node is able to support; and
      use the D2D related capability information to perform one or more tasks.

39. A wireless device for operation in a cellular communications system, comprising:
   a transceiver comprising at least one transmitter and at least one receiver;
   at least one processor; and
   memory containing instructions executable by the at least one processor whereby the wireless device is operative to:
      obtain Device-to-Device (D2D) related capability information for one or more network nodes in the cellular communications system where the D2D related capability information comprises information indicative of resource configuration information of the one or more network nodes in regard to one or more D2D activities where each of the one or more network nodes is one of the group consisting of a radio network node and a core network node; and
      use the D2D related capability information to perform one or more tasks where the one or more tasks comprise at least one of the group consisting of:
         making a decision related to mobility of the wireless device;
         ranking or deciding a priority of at least one of the one or more network nodes for one or more Radio Resource Management (RRM) procedures;
         ranking or deciding a priority of at least one cell served by at least one of the one or more network nodes for one or more RRM procedures;
         selecting one or more measurements for measurement logging; and
         selecting one or more measurements for measurement reporting.

* * * * *